(12) United States Patent
Wang et al.

(10) Patent No.: US 12,422,955 B2
(45) Date of Patent: Sep. 23, 2025

(54) KNUCKLE OPERATION IDENTIFICATION METHOD AND ELECTRONIC DEVICE

(71) Applicant: Honor Device Co., Ltd., Shenzhen (CN)

(72) Inventors: Xiaochen Wang, Shenzhen (CN); Cheng Zhang, Shenzhen (CN); Nuliang Wan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/840,247

(22) PCT Filed: Apr. 28, 2023

(86) PCT No.: PCT/CN2023/091715
§ 371 (c)(1),
(2) Date: Aug. 21, 2024

(87) PCT Pub. No.: WO2024/001501
PCT Pub. Date: Jan. 4, 2024

(65) Prior Publication Data
US 2025/0181193 A1     Jun. 5, 2025

(30) Foreign Application Priority Data
Jul. 1, 2022   (CN) .......................... 202210768211.4

(51) Int. Cl.
G06F 3/041     (2006.01)
G06F 3/044     (2006.01)

(52) U.S. Cl.
CPC ........ *G06F 3/04186* (2019.05); *G06F 3/0446* (2019.05)

(58) Field of Classification Search
CPC .......................... G06F 3/04186; G06F 3/0446
See application file for complete search history.

(56) References Cited

U.S. PATENT DOCUMENTS 10,606,417 B2   3/2020  Schwarz et al.
10,719,680 B2   7/2020  Ye
(Continued)

FOREIGN PATENT DOCUMENTS

CN    105320436 A    2/2016
CN    105446461 A    3/2016
(Continued)

*Primary Examiner* — Amy Onyekaba
(74) *Attorney, Agent, or Firm* — Leydig, Voit & Mayer, Ltd.

(57) ABSTRACT

This application relates to the field of artificial intelligence technologies, and provide a knuckle operation identification method and an electronic device. According to this application, when a knuckle performs an operation on different touch regions of a touch panel, an acceleration signal may have different change trends. A touch feature is extracted from a touch signal for determining a contact area and a contact location, and an acceleration feature is extracted from the acceleration signal for determining a magnitude of a touch on a screen. A capacitor binary classification model is used at the front, to extract a confidence score indicating a correlation to a knuckle from a capacitor signal. Then, feature fusion is performed on the acceleration feature, the confidence score, and the touch feature, and a fused feature is input into a knuckle classification model, to obtain a better classification effect.

16 Claims, 26 Drawing Sheets

(56) References Cited

U.S. PATENT DOCUMENTS

| | | | |
|---|---|---|---|
| 2014/0267100 A1* | 9/2014 | Sohn | G06F 3/0416 |
| | | | 345/173 |
| 2015/0242009 A1 | 8/2015 | Xiao et al. | |
| 2016/0085324 A1 | 3/2016 | Schwarz et al. | |
| 2016/0085372 A1* | 3/2016 | Munemoto | G06F 3/0416 |
| | | | 345/173 |
| 2016/0224145 A1* | 8/2016 | Harrison | G06F 3/0488 |
| 2018/0074637 A1* | 3/2018 | Rosenberg | G06F 3/04166 |
| 2018/0157371 A1* | 6/2018 | Harrison | G06F 3/04186 |
| 2018/0356972 A1* | 12/2018 | Wang | G06F 3/04883 |
| 2019/0317633 A1 | 10/2019 | Tsai et al. | |
| 2022/0050582 A1* | 2/2022 | Zhou | G06F 3/0485 |

FOREIGN PATENT DOCUMENTS

| | | |
|---|---|---|
| CN | 106445120 A | 2/2017 |
| CN | 107077242 A | 8/2017 |
| CN | 107946346 A | 4/2018 |
| CN | 110109563 A | 8/2019 |
| CN | 112445410 A | 3/2021 |
| CN | 113449725 A | 9/2021 |
| CN | 113919390 A | 1/2022 |
| CN | 114567696 A | 5/2022 |

* cited by examiner

| | | | | | | |
|---|---|---|---|---|---|---|
| 7 | 28 | 25 | 46 | 12 | 14 | 4 |
| 8 | 54 | 81 | 142 | 54 | 34 | 17 |
| 29 | 90 | 820 | 823 | 246 | 301 | 45 |
| 34 | 139 | 1,451 | 1,771 | 391 | 111 | 75 |
| 39 | 94 | 389 | 778 | 229 | 119 | 75 |
| 21 | 41 | 85 | 129 | 112 | 90 | 43 |
| 6 | 2 | 37 | 48 | 13 | 29 | 29 |

Knuckle

| | | | | | | |
|---|---|---|---|---|---|---|
| 16 | 8 | 8 | 25 | 30 | 0 | 20 |
| 5 | 34 | 28 | 67 | 8 | 20 | 23 |
| 1 | 21 | 146 | 1,174 | 640 | 62 | 5 |
| 6 | 44 | 204 | 1,741 | 1,165 | 106 | 4 |
| 9 | 27 | 53 | 182 | 325 | 16 | 23 |
| 1 | 5 | 23 | 32 | 33 | 18 | 20 |
| 3 | 3 | 1 | 19 | 19 | 15 | 27 |

Fingertip

| | | | | | | |
|---|---|---|---|---|---|---|
| 14 | 17 | 21 | 30 | 22 | 12 | 20 |
| 13 | 38 | 166 | 248 | 86 | 25 | 5 |
| 40 | 85 | 1,310 | 1,101 | 923 | 112 | 55 |
| 52 | 120 | 1,411 | 1,625 | 1,554 | 120 | 51 |
| 35 | 87 | 517 | 1,522 | 1,401 | 296 | 77 |
| 15 | 52 | 136 | 623 | 522 | 121 | 46 |
| 9 | 26 | 65 | 141 | 145 | 61 | 33 |

Finger pulp

FIG. 22

KNUCKLE OPERATION IDENTIFICATION METHOD AND ELECTRONIC DEVICE

CROSS-REFERENCE TO RELATED APPLICATIONS

This application is a national stage of International Application No. PCT/CN2023/091715, filed on Apr. 28, 2023, which claims priority to Chinese Patent Application No. 202210768211.4, filed on Jul. 1, 2022. The disclosures of both of the aforementioned applications are hereby incorporated by reference in their entireties.

TECHNICAL FIELD

Embodiments of this application relate to the field of artificial intelligence (AI) technologies, and in particular, to a knuckle operation identification method and an electronic device.

BACKGROUND

As a man-machine interaction apparatus in an electronic device, a touch panel (TP) is increasingly widely applied.

At present, knuckles are commonly used by users for interaction with touch panels. When a user uses a knuckle to touch a touch panel, an electronic device changes a signal that has detected a touch point. Then, the electronic device may identify a knuckle identification manner based on the changed signal, and perform, based on duration of a touch of the knuckle on the touch panel, a distance that the user swipes the knuckle on the touch panel, and the like, shortcut functions such as taking a screenshot, screen recording, and window switching.

However, a conventional knuckle touch detection algorithm has various problems. For example, generalization performance of the conventional knuckle touch detection algorithm is not good enough, causing a low identification rate of the knuckle identification manner. For another example, an anti-misoperation capability of the conventional knuckle touch detection algorithm is not good enough, causing incapability to effectively filter out a non-knuckle identification manner and a high false touch rate. Therefore, how to optimize the knuckle touch detection algorithm becomes an urgent technical problem to be resolved.

SUMMARY

This application provides a knuckle operation identification method and an electronic device, to resolve problems of a conventional knuckle touch detection algorithm, such as a low identification rate and a high false touch rate, improving a knuckle identification effect.

To achieve the foregoing objective, the following technical solutions are used in this application.

According to a first aspect, an embodiment of this application provides a knuckle operation identification method. The method includes:

receiving a touch operation on a touch panel;

obtaining an acceleration (ACC) signal, a capacitor (CAP) signal, and a touch signal in response to the touch operation, where the ACC signal is a raw signal acquired by an ACC sensor, the CAP signal is a raw signal acquired by a CAP sensor, and the touch signal is a signal obtained by processing the CAP signal;

extracting an ACC feature, a confidence (score) feature, and a touch feature, where the ACC feature is a feature, in the ACC signal, associated with a knuckle operation, the confidence score is a feature, in the CAP signal, associated with the knuckle operation, and the touch feature is a feature, in the touch signal, associated with the knuckle operation;

performing feature fusion on the ACC feature, the confidence score, and the touch feature; and inputting a fused feature into a knuckle classification model to obtain a target classification result, where the target classification result indicates whether the touch operation is a knuckle operation or a non-knuckle operation.

It should be understood that, when a knuckle performs an operation on different touch regions of the touch panel, the ACC signal may have different change trends. Therefore, in this embodiment of this application, it is proposed to extract the touch feature from the touch signal for determining a contact area and a contact location, and to extract the ACC feature from the ACC signal for determining a magnitude of a touch on a screen. In addition, the confidence score indicating a correlation to a knuckle is extracted from the CAP signal. Then, feature fusion is performed on the ACC feature, the confidence score, and the touch feature, and a fused feature is input into the knuckle classification model, to obtain a better classification effect, improving a knuckle operation identification rate and reducing a non-knuckle operation false touch rate.

In a possible implementation, the confidence score is a feature extracted from the touch signal when the acceleration feature indicates that the touch operation is a knuckle operation. It should be understood that, when the acceleration feature indicates that the touch operation is a non-knuckle operation, an electronic device does not need to extract the confidence score from the touch signal, and does not need to perform a subsequent operation, for example, feature fusion.

In a possible implementation, the extracting an ACC feature, a confidence score, and a touch feature includes:

extracting the ACC feature from the ACC signal;

inputting the ACC feature into an ACC binary classification model to obtain a preliminary classification result; and when the preliminary classification result indicates that the touch operation is a knuckle operation, inputting the CAP signal into a CAP binary classification model to obtain the confidence score, and extracting the touch feature from the touch signal.

In a possible implementation, the extracting an ACC feature, a confidence score, and a touch feature includes:

extracting the ACC feature from the ACC signal, and extracting the touch feature from the touch signal;

inputting the ACC feature into an ACC binary classification model to obtain a preliminary classification result; and when the preliminary classification result indicates that the touch operation is a knuckle operation, inputting the CAP signal into a CAP binary classification model to obtain the confidence score.

It should be understood that, as a manually-set preset threshold is canceled and the ACC feature is classified by using the ACC binary classification model, a manual selection manner is replaced with a machine selection manner, to improve ACC feature selection efficiency and improve a knuckle signal selection effect.

In a possible implementation, the touch feature includes at least one of a contact location feature and a contact area feature. The contact location feature indicates a location of interaction between a body part and the touch panel, and the contact area feature indicates a contact area of the body part with the touch panel.

In a possible implementation, the contact location feature indicates a square coordinate number of a square in which a touch point is located. The square in which the touch point is located is at least one square in a grid obtained by dividing the touch panel based on resolution of the touch panel.

It should be understood that, there are problems of a large amount of computations and proneness to user privacy leakage when a touch location is represented by coordinates. As a square feature is set, an approximate location of the touch point on the touch panel can be determined while the amount of computations can be reduced and privacy is protected, and whether the touch operation is a knuckle operation can be further determined.

In a possible implementation, the grid includes p rows and q columns of squares. A length of each square in the grid is equal to a quantity of pixels on a vertical axis of the touch panel divided by p. A width of each square in the grid is equal to a quantity of pixels on a horizontal axis of the touch panel divided by q. p and q are positive integers.

In a possible implementation, when the touch feature includes the contact location feature, extracting the contact location feature includes:
  determining an x coordinate and ay coordinate of the touch point based on the touch signal; and
  determining, based on the x coordinate and the y coordinate the contact location feature indicating the square coordinate number of the square in which the touch point is located.

An x-axis is a horizontal direction of a plane on which the touch panel is located, and a y-axis is a vertical direction of the plane on which the touch panel is located.

In a possible implementation, the ACC feature includes at least one of the following: a maximum gradient feature, a signal amplitude feature, a front-part zero cross counting feature, a maximum high pass feature, a mean-add-absolute-value feature, a front-part normalized value square error feature, a front-part normalized value amplitude feature, a fast Fourier transform mean feature, and a part fast Fourier transform mean feature.

In a possible implementation, the confidence score is a score. The score indicates a degree of association between the CAP signal and a knuckle operation.

In a possible implementation, the CAP binary classification model is a convolutional neural network model.

In a possible implementation, the ACC binary classification model is a fully connected neural network model.

In a possible implementation, the knuckle classification model is a fully connected neural network model.

In a possible implementation, the method further includes: determining, when the target classification result indicates that the touch operation is a knuckle operation, a knuckle gesture to which the touch operation belongs, and performing a responsive function corresponding to the knuckle gesture. Different knuckle gestures correspond to different responsive functions.

In a possible implementation, the knuckle gesture includes at least one of the following: a gesture of knocking twice with a knuckle, a gesture of knocking and drawing an enclosed region with a knuckle, a gesture of knocking with a knuckle and drawing a letter S, a gesture of swiping down on a screen from top to bottom with three knuckles, a gesture of knocking twice with two knuckles, and a gesture of knocking and drawing a straight line in the middle of the screen with a knuckle.

In a possible implementation, a responsive function corresponding to the gesture of knocking twice with a knuckle is a function of taking a full screenshot.

In a possible implementation, a responsive function corresponding to the gesture of knocking and drawing an enclosed region with a knuckle is a function of capturing part of the screen.

In a possible implementation, a responsive function corresponding to the gesture of knocking with a knuckle and drawing a letter S is a function of taking a scrollshot.

In a possible implementation, a responsive function corresponding to the gesture of swiping down on a screen from top to bottom with three knuckles is a function of swiping to take a screenshot.

In a possible implementation, a responsive function corresponding to the gesture of knocking twice with two knuckles is a function of starting or ending screen recording.

In a possible implementation, a responsive function corresponding to the gesture of knocking and drawing a straight line in the middle of the screen with a knuckle is a function of screen splitting.

According to a second aspect, this application provides an identification apparatus. The apparatus includes a unit/module configured to perform the method according to the first aspect. The apparatus may correspondingly perform the method described in the first aspect. For related descriptions of the unit/module in the apparatus, refer to the descriptions in the first aspect. For brevity, details are not provided herein again.

According to a third aspect, an electronic device is provided, and includes a processor. The processor is coupled to a memory, and the processor is configured to execute a computer program or instructions stored in the memory, to enable the electronic device to implement the knuckle operation identification method according to any implementation of the first aspect.

According to a fourth aspect, a chip is provided. The chip is coupled to a memory. The chip is configured to read and execute a computer program stored in the memory, to implement the knuckle operation identification method according to any implementation of the first aspect.

According to a fifth aspect, a computer-readable storage medium is provided. The computer-readable storage medium stores a computer program, and when the computer program is run on an electronic device, the electronic device is enabled to perform the knuckle operation identification method according to any implementation of the first aspect.

According to a sixth aspect, a computer program product is provided. When the computer program product is run on a computer, the computer is enabled to perform the knuckle operation identification method according to any implementation of the first aspect.

It should be understood that, for beneficial effects of the second aspect to the sixth aspect, refer to related descriptions in the first aspect. Details are not provided herein again.

BRIEF DESCRIPTION OF DRAWINGS

FIG. 22 is a diagram of a group of 7*7 node matrices respectively corresponding to knuckles, fingertips, and finger pulps according to an embodiment of this application;

DESCRIPTION OF EMBODIMENTS

Figure 1:
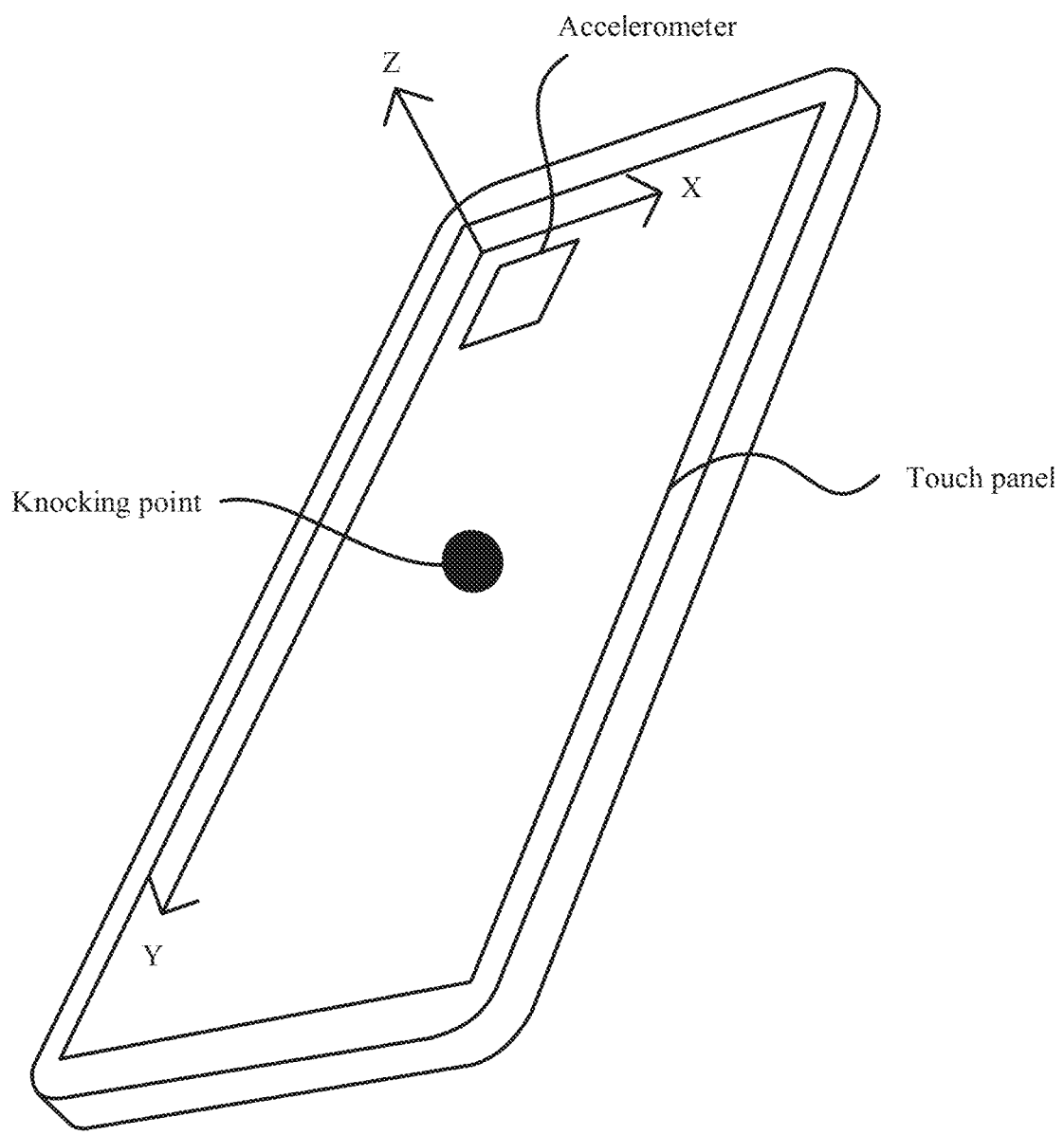
FIG. 1 is a diagram of a touch panel disposed with an accelerometer according to an embodiment of this application.

To make the objectives, technical solutions, and advantages of embodiments of this application clearer, the following clearly and completely describes the technical solutions in embodiments of this application with reference to the accompanying drawings in embodiments of this application. Clearly, the described embodiments are some of rather than all embodiments of this application.

In the descriptions of this application, unless otherwise specified, "/" means "or". For example, A/B may represent A or B. In the descriptions of embodiments of this application, "and/or" is merely used to describe an association relationship between associated objects, and represents that three relationships may exist. For example, A and/or B may represent the following three cases: Only A exists, both A and B exist, and only B exists.

In the description and the claims of this application, the terms "first", "second", and the like are intended to distinguish between different objects or distinguish between different processing on a same object, but do not indicate a particular order among the objects. For example, a first threshold, a second threshold, and the like are used to distinguish between different thresholds, but are not intended to indicate a particular order among the thresholds. In embodiments of this application, a "plurality of" means two or more.

As described in the description of this application, referring to "one embodiment", "some embodiments", or the like means that a specific feature, structure, or characteristic described with reference to the embodiment/embodiments is included in one or more embodiments of this application. Therefore, statements such as "in one embodiment", "in some embodiments", "in some other embodiments", "in some more other embodiments" that appear in different places in the description do not necessarily refer to same embodiments, but mean "one or more but not all embodiments", unless otherwise particularly emphasized in another manner. The terms "include", "contain", "have", and their variants all mean "include but are not limited to", unless otherwise particularly emphasized in another manner.

Some nouns or terms involved in this application are first explained.

A touch panel is also referred to as a touch screen, a touchscreen, and is an inductive liquid crystal display apparatus that can receive signals input by using a stylus, a finger, and the like. Usually, the touch panel includes a touch detection component and a touch panel controller. The touch detection component is mounted at an upper layer of the liquid crystal display apparatus, and is configured to: detect touch information, for example, a touch location of a user, and transfer the detected touch information to the touch panel controller. The touch panel controller is configured to process the touch information and send a corresponding signal to a processor. Then, the processor processes the signal and performs a corresponding responsive action, for example, turning on or off, opening an application, capturing an image, taking a screenshot, or switching a window.

In some embodiments, the touch detection component includes a plurality of types of sensors such as an ACC sensor, a CAP sensor, a piezoelectric bending element, a piezoelectric thin film, a potentiometer, a variable-reluctance transducer, a piezoelectric sensor, piezoresistive sensor, a servo sensor, a shift sensor, a velocity sensor, a vibration sensor, a micro-electro-mechanical system (MEMS), a gyroscope, a proximity sensor, an electric microphone, a hydrophone, a capacitor microphone, an electret capacitor microphone, a dynamic microphone, a ribbon type microphone, a carbon microphone, a piezoelectric microphone, a fiber optic microphone, a laser microphone, and a liquid microphone.

When a body part, for example, a palm, a finger pulp, a fingertip, a finger nail, a lateral nail, or a knuckle of a user comes in contact with the touch panel, there is a touch event. With the touch event, a sensor acquires two types of raw signals.

A first type of raw signals is motion signals acquired by the ACC sensor, an impact sensor, the vibration sensor, and the like when there is a mechanical vibration because of a mechanical force applied by a user onto a surface of the touch panel. The motion signals may be used to measure a magnitude of the mechanical force applied by the user onto the touch panel. Because of the mechanical force, an electronic device may switch from a stationary state to a motion state, or may switch from a motion state to a stationary state. Therefore, the motion signals may also indicate the motion/stationary state of the electronic device because of the mechanical force.

An ACC signal acquired by the ACC sensor is used as an example for description.

For example, as shown in FIG. 1, a touch panel of an electronic device is disposed with an accelerometer, for example, a linear variable differential transformer (LVDT) The accelerometer may include components such as the ACC sensor, a support, a potentiometer, a spring, and a housing. The ACC signal acquired by the accelerometer may carry acceleration data, angular velocity data, and/or the like. The acceleration data may indicate a value of linear acceleration, and the angular velocity data may indicate a value of angular acceleration.

The acceleration data may be values of acceleration of the electronic device respectively along an x-axis, a y-axis, and a z-axis. The x-axis is a horizontal direction of a plane on which the touch panel is located, the y-axis is a vertical direction of the plane on which the touch panel is located, and the z-axis is a direction perpendicular to the touch panel. When the electronic device is placed on a table and the electronic device is in a stationary state, a variation of acceleration is zero or approaches zero, for example, variations of acceleration along the x-axis, the y-axis, and the z-axis are all less than or equal to 0.1 g. In this case, it may be determined that the electronic device is in the stationary state. When a user uses a finger to knock on a specific knock point on the touch panel, because of a mechanical force, a variation of acceleration is not zero or does not approach zero, for example, variations of acceleration along the x-axis, the y-axis, and the z-axis are greater than 0.1 g. In this case, it may be determined that the electronic device is in a motion state.

The angular velocity data is values of angular velocities of the electronic device about the x-axis, the y-axis, and the z-axis. If a variation of an angular velocity in each direction is zero or approaches zero, for example, variations of angular velocities about the x-axis, the y-axis, and the z-axis are all less than 3 radians per second, it is determined that the electronic device is in the stationary state. If a variation of an angular velocity in any direction is not zero or does not approach zero, for example, variations of angular velocities about the x-axis, the y-axis, and the z-axis are greater than 3 radians per second, it may be determined that the electronic device is in the motion state.

It should be understood that, when a mechanical force on the touch panel is greater, a variation of acceleration is greater, and therefore the ACC signal may be used to measure a magnitude of the mechanical force.

A second type of raw signals is TP signals acquired by a CAP sensor, a piezoelectric sensor, a piezoresistive sensor, and the like. The TP signal is associated with a touch feature of a body part of the user in contact with the touch panel, and is used to determine a touch event type.

A CAP signal acquired by the CAP sensor is used as an example for description. The CAP sensor may be an integrated circuit (IC) chip for acquiring the CAP signal. The IC chip may include IC electrodes.

Figure 2:
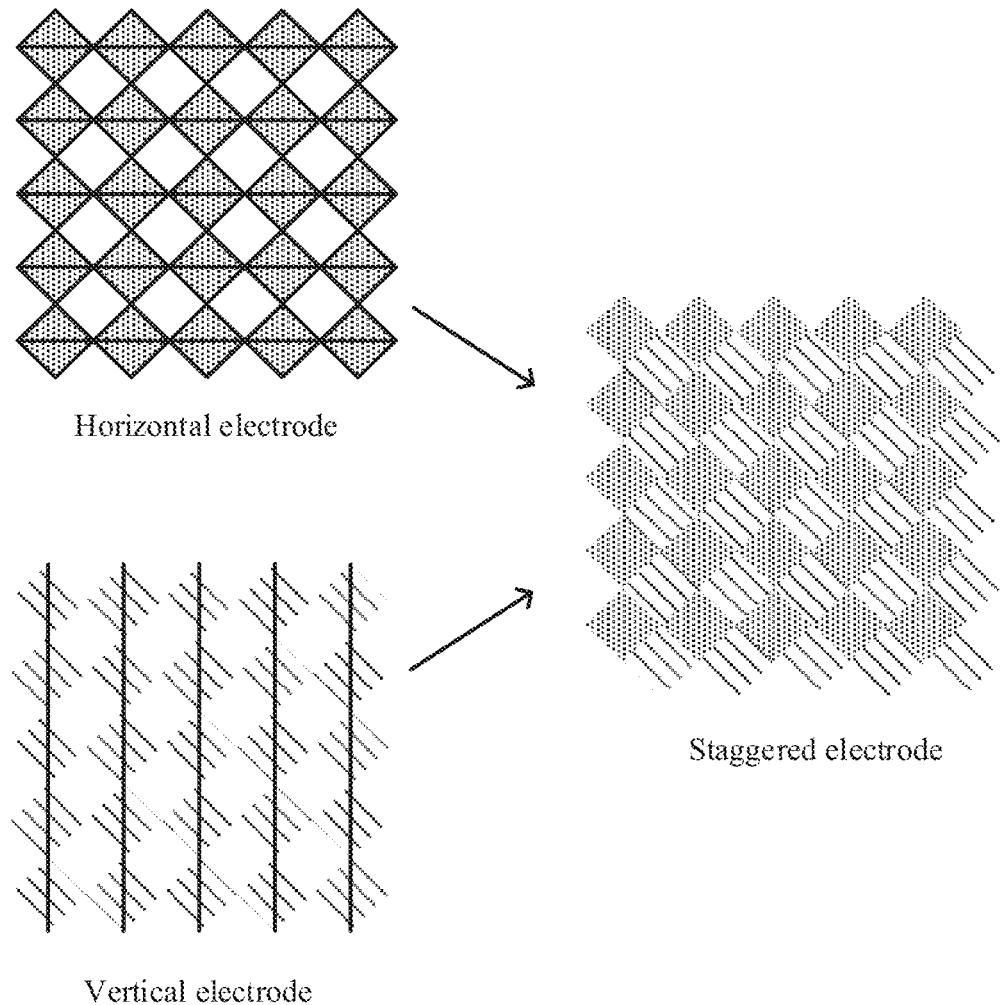
FIG. 2 is a diagram of IC electrode arrangement in a mutual-capacitive touch panel according to an embodiment of this application.

For example, FIG. 2 is a diagram of IC electrode arrangement in a mutual-capacitive touch panel. For the mutual-capacitive touch panel, different indium-tin-oxide (ITO) conductive circuit modules are obtained by etching on two ITO conductive glass layers. The conductive circuit modules at the two layers are perpendicular to each other on a display of the touch panel to form horizontal electrodes and vertical electrodes. The horizontal electrodes and the vertical electrodes may be regarded as sliders that continuously change in directions of the x-axis and the y-axis. As the horizontal electrodes and the vertical electrodes are at different surfaces, one capacitor node is formed at a place where two groups of electrodes intersect. One slider may be regarded as a drive line, and the other slider may be regarded as a detection line. When a current flows through one wire in the drive line, if there is a capacitance change outside, a capacitor node at another layer of wires changes.

Figure 3:
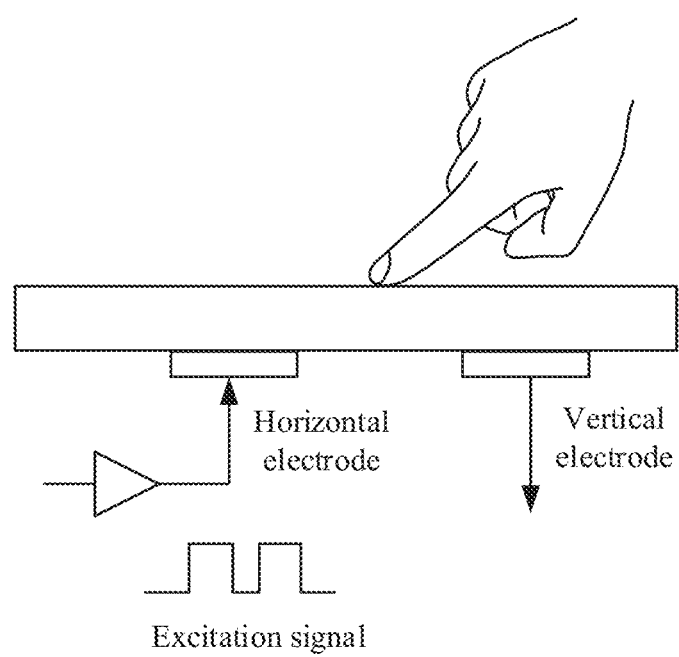
FIG. 3 is a diagram of an operating principle of a mutual-capacitive touch panel according to an embodiment of this application.

For example, FIG. 3 is a diagram of an operating principle of a mutual-capacitive touch panel. A controller of the mutual-capacitive touch panel periodically and successively emits excitation signals, also referred to as drive signals, at a horizontal electrode. Then, a vertical electrode obtains a response signal, to obtain values of capacitances at all intersection points of horizontal electrodes and vertical electrodes, that is, to obtain a capacitance value of a two-dimensional plane of the entire mutual-capacitive touch panel. When a finger touches the mutual-capacitive touch panel, coupling between two electrodes near a touch point is caused. In other words, a new capacitance is introduced for the two electrodes. This changes an electric charge measured by using a vertical electrode, to change a value of a capacitance between the two electrodes.

In an optional implementation, the CAP signal is the response signal. In other words, values of capacitances of all capacitor nodes may be determined based on the CAP signal. In another optional implementation, as the mutual-capacitive touch panel usually includes a large quantity of capacitor nodes, when a finger touches the mutual-capacitive touch panel, only a value of a capacitance of a capacitor node near a touch point changes. Therefore, the IC chip can extract the CAP signal from the response signal based on the touch point. The CAP signal indicates a value of a capacitance of each capacitor node in a node matrix. The node matrix may include m rows and n columns of capacitor nodes. For example, a value of a capacitance of a central node in the node matrix is the largest among values of capacitances that are of all capacitor nodes and that are indicated by the response signal. In other words, a capacitor node corresponding to the largest capacitance value is the central node in the node matrix. The node matrix is equivalent to a touch region that is delimited with the central node as the center and that includes a plurality of capacitor nodes. It should be understood that, because both the response signal and the CAP signal can indicate a value of a capacitance of a capacitor node, the two signals may be both referred to as raw signals.

It should be noted that, specific values of m and n may be set based on an identification manner, a quantity of capacitor nodes of the touch panel, and the like. This is not limited in embodiments of this application. m and n are positive integers.

In some embodiments, values of m and n may be equal, for example, m=n=7.

In some other embodiments, values of m and n may alternatively not be equal, for example, m=7, and n=9.

Figure 4:
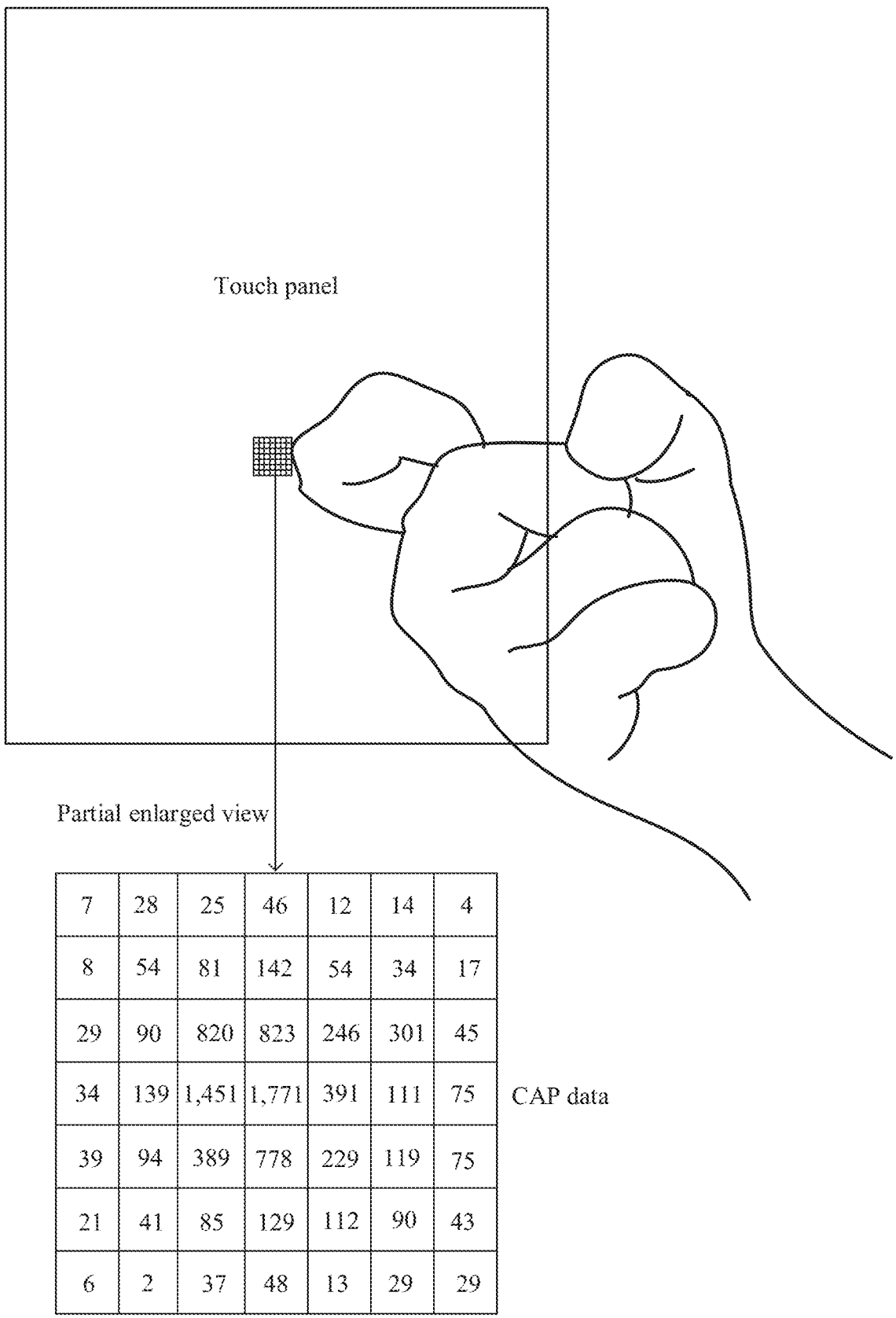
FIG. 4 is a diagram of a node matrix corresponding to a CAP signal according to an embodiment of this application.

For example, FIG. 4 is a diagram of a node matrix corresponding to a CAP signal. When a user uses a knuckle of an index finger to touch the touch panel, the IC chip acquires the CAP signal. The CAP signal includes a set of CAP data. The CAP data includes a value of a capacitance of each capacitor node in a 7*7 node matrix. A value of a capacitance of a central node in the 7*7 node matrix is 1,771. The value of the capacitance, 1,771, of the central node is the largest among values of capacitances of all capacitor nodes of the touch screen. It should be understood that, as a change of the value of the capacitance of each capacitor node in the 7*7 node matrix is caused by contact of a body part of the user with the touch panel, the CAP signal is associated with a touch feature of the body part of the user in contact with the touch panel.

When the body part of the user comes in contact with the touch panel, although the acquired CAP signal is associated with the touch feature of the body part of the user in contact with the touch panel, because the CAP signal is a raw signal that merely carries capacitance information of the capacitor node and the CAP signal cannot directly reflect the touch feature when the body part of the user comes in contact with the touch panel, the electronic device cannot directly determine, based on the CAP signal, whether the touch screen is touched by the body part (for example, a knuckle) of the user. In this case, the electronic device needs to process the CAP signal to obtain a touch signal. The touch signal can directly show the touch feature when the body part of the user comes in contact with the touch panel.

For example, the touch signal may carry touch data, for example, orientation data that describes a direction of a touch region and a tool region in radians clockwise from a vertical direction; pressure data that describes pressure applied by a finger or another tool onto the device; size data that describes a size of a pointer touch region related to a set maximum detectable size; toolMajor data that indicates a length of a major axis of an ellipse that describes a size of an approaching tool; toolMinor data that indicates a length of a minor axis of an ellipse that describes the size of the approaching tool; touchMajor data that indicates a length of a major axis of an ellipse that describes a touch region at a point of contact; touchMinor data that indicates a length of a minor axis of an ellipse that describes a touch region at a point of contact; x data that describes an x coordinate of a pointer in motion; and x data that describes a y coordinate of the pointer in motion. The touch data can indicate the touch feature. For example, the x data and the y data indicate a touch location of a touch point on the touch panel.

In embodiments of this application, three types of signals, that is, the ACC signal, the CAP signal, and the touch signal, are described above. The ACC signal is a raw signal acquired by the ACC sensor and indicates a motion/stationary state of the electronic device because of a mechanical force. The CAP signal is a raw signal acquired by the CAP sensor, and the raw signal carries the capacitance information of the capacitor node. The touch signal is a signal obtained by processing the CAP signal and may indicate the touch feature when the body part of the user comes in contact with the touch panel.

With reference to analysis in the foregoing embodiments, all the three types of signals are associated with the body part. When the user uses different body parts to touch the touch panel, signal features of the three types of signals are different. The electronic device can identify different body parts based on the signal features of the three types of signals. Embodiments of this application are intended for knuckle identification based on the three types of signals.

The following describes two algorithms for knuckle identification based on the three types of signals.

Figure 5:
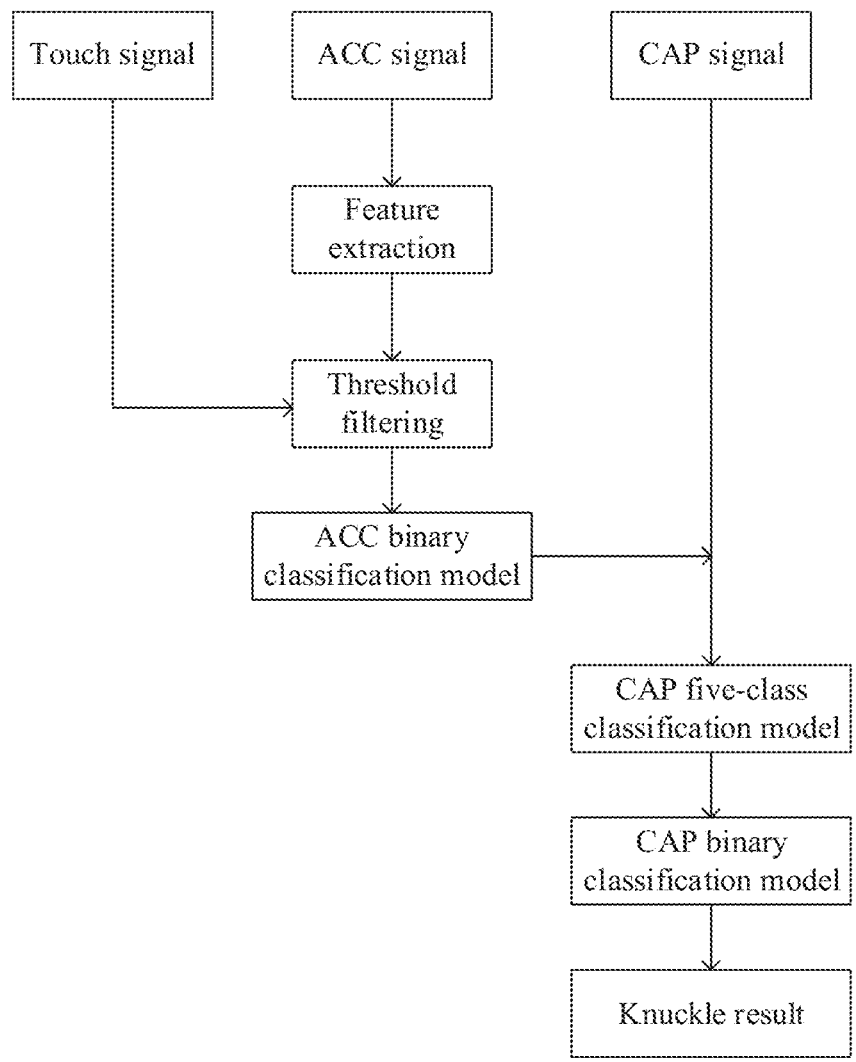
FIG. 5 is a schematic flowchart of a knuckle touch detection algorithm according to an embodiment of this application.

FIG. 5 is a schematic flowchart of a knuckle touch detection algorithm. The algorithm includes the following steps.

Step 51: Obtain an ACC signal, a CAP signal, and a touch signal in response to a touch operation of a user.

For these three types of signals, refer to specific descriptions in the foregoing embodiments. Details are not provided herein again.

Step 52: Perform feature extraction on the ACC signal to obtain an ACC feature.

The ACC feature is a feature, in the ACC signal, associated with a knuckle touch operation, and may be used to determine a magnitude of a force when a body part performs an operation on a touch panel. It should be understood that, different gestures may correspond to different magnitudes of forces, and the ACC feature extracted from the ACC signal may vary.

Step 53: Perform preliminary selection on the ACC feature and the touch signal by using preset thresholds.

A threshold corresponding to the touch signal may be a preset area threshold, and a threshold corresponding to the ACC feature may be a preset feature threshold. It should be noted that, there are one or more ACC features extracted from the ACC feature. For a plurality of ACC features, different ACC features may correspond to different preset thresholds.

The touch operation received by the electronic device may be a knuckle operation, or may be a non-knuckle operation. As regularities of distribution of an ACC feature corresponding to a knuckle operation and an ACC feature corresponding to a non-knuckle operation may be different, the preset feature threshold may be used for preliminary selection on some non-knuckle signals. When an ACC feature does not satisfy the preset feature threshold, it can be directly determined that the touch operation is a non-knuckle operation, and there is no need to perform the subsequent step 54 to step 56. When an ACC feature satisfies the preset feature threshold, because selection on a signal is performed only roughly, a non-knuckle operation may be erroneously identified as a knuckle operation, and therefore step 54 to step 56 need to be performed, to further accurately detect whether a touch operation is a knuckle operation.

In addition, a touch signal corresponding to a knuckle operation and a touch signal corresponding to a non-knuckle operation may also be different. For example, a contact area of a finger pulp with the touch panel is larger, while a contact area of a knuckle with the touch panel is smaller. Therefore, the preset area threshold may be used for preliminary selection on some non-knuckle signals. When a contact area corresponding to a touch signal is greater than the preset area threshold, it can be directly determined that the touch operation is a non-knuckle operation, and there is no need to perform the subsequent step 54 to step 56. When a contact area corresponding to a touch signal is less than the preset area threshold, because selection on a signal is performed only roughly, a non-knuckle operation may be erroneously identified as a knuckle operation, and therefore step 54 to step 56 need to be performed, to further accurately detect whether the touch operation is a knuckle operation.

For different ACC features, thresholds that are set and selection manners may be different. For example, for some ACC features, a first threshold is set, to filter out a feature less than the first threshold; for some other ACC features, a second threshold is set, to filter out a feature greater than the second threshold; and for some more ACC features, a third threshold and a fourth threshold are set, to filter out a feature less than the third threshold and a feature greater than the fourth threshold, where the third threshold is less than the fourth threshold.

Step 54: Input the ACC signal into an ACC binary classification model.

When the ACC feature satisfies the preset feature threshold and the touch signal satisfies the preset contact area threshold, there is a high possibility that the touch operation is a knuckle operation. Therefore, the ACC binary classification model may be used for ACC signal binary classification for accurate detection, to obtain any one of the following classification results.

One classification result is that the touch operation on the touch panel is a knuckle touch operation; and the other classification result is that the touch operation on the touch panel is a non-knuckle touch operation.

If an output result of the ACC binary classification model is that the touch operation on the touch panel is a knuckle touch operation, the following step 55 is performed.

If an output result of the ACC binary classification model is that the touch operation on the touch panel is a non-knuckle touch operation, the electronic device does not perform any processing, or continues to determine a specific non-knuckle touch operation type, for example, a finger pulp, fingertip, finger nail, or lateral nail operation, to perform a responsive function corresponding to the non-knuckle touch operation.

Step 55: Input the CAP signal into a CAP five-class classification model to obtain a classification result of the CAP five-class classification model.

The CAP five-class classification model is used for five-class classification based on the raw CAP signal to obtain any one of the following classification results.

A first classification result is that the touch operation on the touch panel is a knuckle touch operation;
a second classification result is that the touch operation on the touch panel is a finger pulp touch operation;
a third classification result is that the touch operation on the touch panel is a fingertip touch operation;
a fourth classification result is that the touch operation on the touch panel is a finger nail touch operation; and
a fifth classification result is that the touch operation on the touch panel is a lateral nail touch operation.

If the classification result of the CAP five-class classification model is that the touch operation on the touch panel is a knuckle touch operation, the following step 56 is performed.

If the classification result of the CAP five-class classification model is that the touch operation on the touch panel is a finger pulp touch operation, a responsive function corresponding to the finger pulp touch operation is performed.

If the classification result of the CAP five-class classification model is that the touch operation on the touch panel is a fingertip touch operation, a responsive function corresponding to the fingertip touch operation is performed.

If the classification result of the CAP five-class classification model is that the touch operation on the touch panel is a finger nail touch operation, a responsive function corresponding to the finger nail touch operation is performed.

If the classification result of the CAP five-class classification model is that the touch operation on the touch panel is a lateral nail touch operation, a responsive function corresponding to the lateral nail touch operation is performed.

Step 56: Input the CAP signal into a CAP binary classification model to obtain a classification result of the CAP binary classification model.

It should be noted that, in the foregoing step 55, a gesture may be erroneously determined. Therefore, the electronic device may further input the CAP signal into the CAP binary classification model to obtain the classification result of the CAP binary classification model, to improve knuckle identification accuracy and reduce a user operation false touch rate.

The CAP binary classification model is used for binary classification based on the raw CAP signal to obtain any one of the following classification results.

If an output result of the CAP binary classification model is that the touch operation on the touch panel is a knuckle touch operation, the electronic device may perform a responsive function corresponding to the knuckle touch operation.

If an output result of the CAP binary classification model is that the touch operation on the touch panel is a non-knuckle touch operation, no processing is performed, or a responsive function corresponding to the non-knuckle touch operation is performed.

Figure 6:
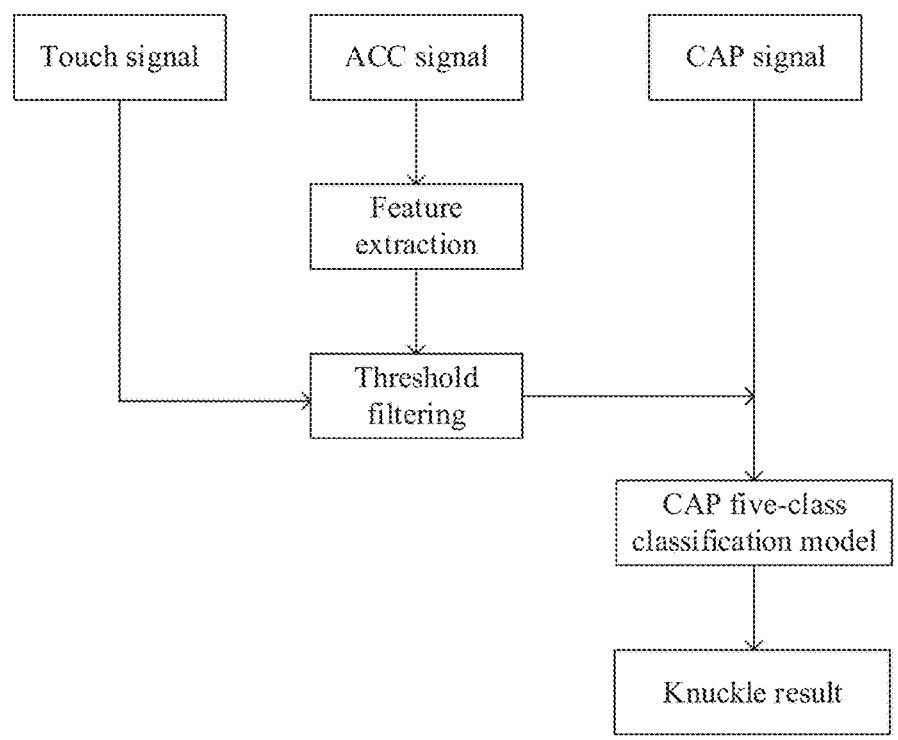
FIG. 6 is a schematic flowchart of another knuckle touch detection algorithm according to an embodiment of this application.

FIG. 6 is a schematic flowchart of another knuckle touch detection algorithm. The algorithm includes the following steps.

Step 61: Obtain an ACC signal, a CAP signal, and a touch signal in response to a touch operation of a user.

For these three types of signals, refer to specific descriptions in the foregoing embodiments. Details are not provided herein again.

Step 62: Perform feature extraction on the ACC signal to obtain an ACC feature.

The ACC feature is a feature, in the ACC signal, associated with a knuckle touch operation.

Step 63: Perform preliminary selection on the ACC feature and the touch signal by using preset thresholds. A threshold corresponding to the touch signal may be a preset area threshold, and a threshold corresponding to the ACC feature may be a preset feature threshold.

For a specific implementation of step 63, refer to the descriptions of the foregoing step 53. Details are not provided herein again.

Step 64: When the ACC feature satisfies the preset feature threshold and the touch signal satisfies the preset contact area threshold, input the raw CAP signal into a CAP five-class classification model to obtain a classification result of the CAP five-class classification model.

The CAP five-class classification model is used for five-class signal classification to obtain any one of the following classification results.

A first classification result is that the touch operation on the touch panel is a knuckle touch operation;

a second classification result is that the touch operation on the touch panel is a finger pulp touch operation;

a third classification result is that the touch operation on the touch panel is a fingertip touch operation;

a fourth classification result is that the touch operation on the touch panel is a finger nail touch operation; and a fifth classification result is that the touch operation on the touch panel is a lateral nail touch operation.

If the classification result of the CAP five-class classification model is that the touch operation on the touch panel is a knuckle touch operation, a responsive function corresponding to the knuckle touch operation is performed.

If the classification result of the CAP five-class classification model is that the touch operation on the touch panel is a finger pulp touch operation, a responsive function corresponding to the finger pulp touch operation is performed.

If the classification result of the CAP five-class classification model is that the touch operation on the touch panel is a fingertip touch operation, a responsive function corresponding to the fingertip touch operation is performed.

If the classification result of the CAP five-class classification model is that the touch operation on the touch panel is a finger nail touch operation, a responsive function corresponding to the finger nail touch operation is performed.

If the classification result of the CAP five-class classification model is that the touch operation on the touch panel is a lateral nail touch operation, a responsive function corresponding to the lateral nail touch operation is performed.

The ACC binary classification model, the CAP binary classification model, and the CAP five-class classification model in FIG. 5 and FIG. 6 are conventional machine learning models or neural network models.

It should be understood that, compared with the algorithm provided in FIG. 5, the algorithm provided in FIG. 6 omits the ACC binary classification model and the CAP binary classification model. Because the algorithm provided in FIG. 6 is simpler, which is equivalent to relaxing a knuckle detection condition, a knuckle identification rate is improved, but a higher non-knuckle false touch rate is also caused.

It should be noted that, the preset thresholds in the foregoing two algorithms are thresholds finally obtained after personnel have made a plurality of times of adjustments by manually setting the thresholds in a research and development stage of the electronic device. However, this manual selection manner relies too much on subjective commissioning. In addition, a selection effect of the manual selection manner is not ideal.

The following describes the selection effect of the manual selection manner by using examples with reference to FIG. 7 to FIG. 10.

Figure 7:
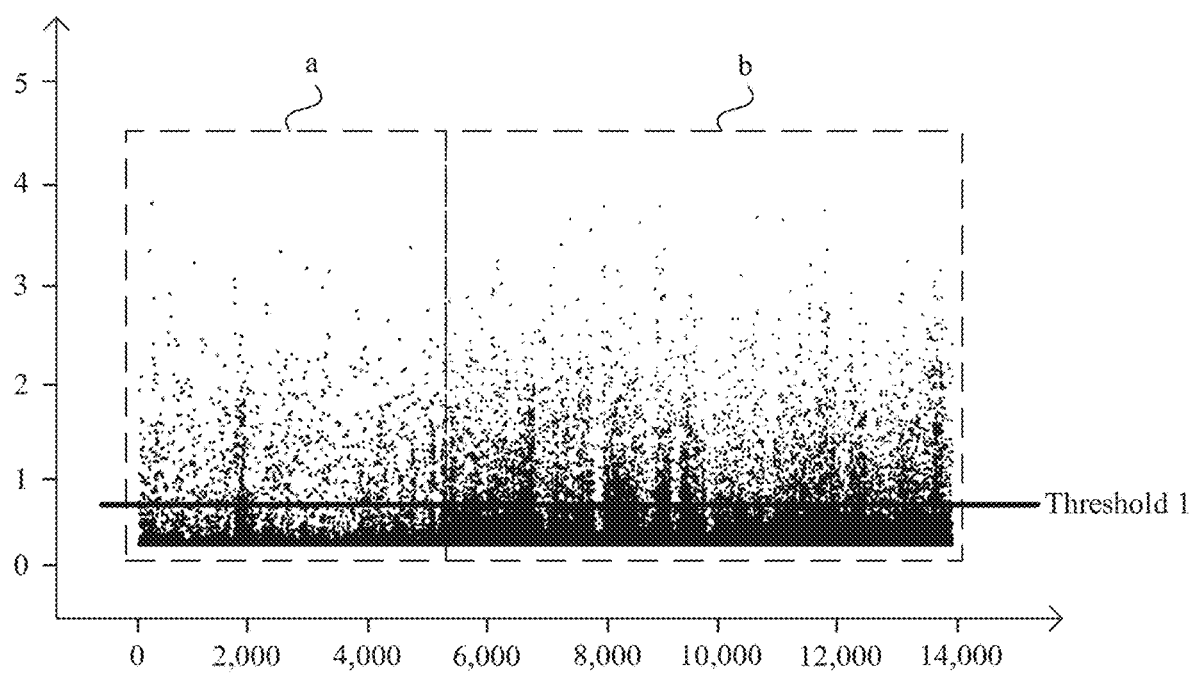
FIG. 7 is a diagram of manual ACC feature selection by using a threshold 1 according to an embodiment of this application.
Figure 8:
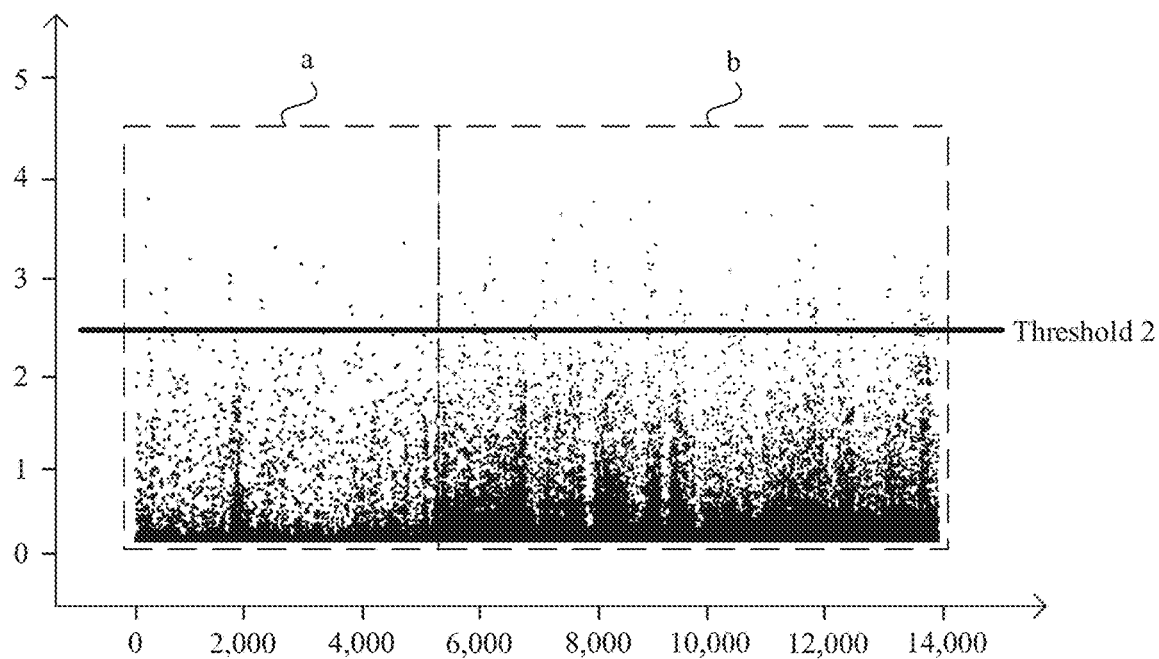
FIG. 8 is a diagram of manual ACC feature selection by using a threshold 2 according to an embodiment of this application.

For example, FIG. 7 and FIG. 8 are diagrams of manual selection on an ACC feature.

It is assumed that a horizontal axis represents a serial number of a data feature, and a vertical axis represents a value of the data feature. A plurality of knuckle feature points (that is, ACC feature points) are surrounded by a dashed box a, and a plurality of non-knuckle feature points are surrounded by a dashed box b. Value distributions of the knuckle feature points and the non-knuckle feature points are approximate to each other.

As shown in FIG. 7, if a preset threshold is set to a threshold 1, and a selection rule is to filter out a feature point less than the threshold 1, an electronic device filters out a few non-knuckle feature points less than the threshold 1. However, in this case, a lot of non-knuckle feature points still remain, and a lot of invalid non-knuckle feature points are input into a classification model, causing an inaccurate classification result that is finally obtained.

As shown in FIG. 8, if a preset threshold is set to a threshold 2, where the threshold 2 is greater than the threshold 1, and a selection rule is to filter out a feature point less than the threshold 2, an electronic device filters out a lot of non-knuckle feature points less than the threshold 2. However, a majority of knuckle feature points less than the threshold 2 is also filtered out, and most valid knuckle features are filtered out. As a result, a classification model cannot perform accurate classification due to insufficient valid data.

Figure 9:
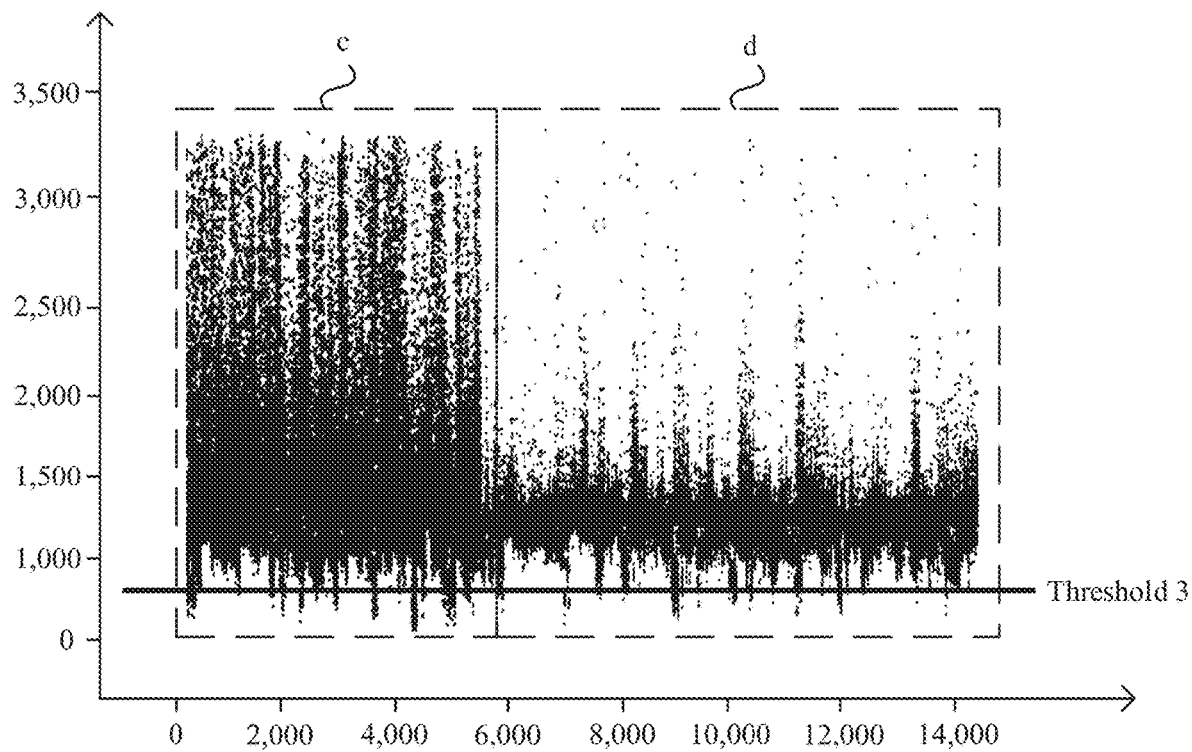
FIG. 9 is a diagram of manual ACC feature selection by using a threshold 3 according to an embodiment of this application.
Figure 10:
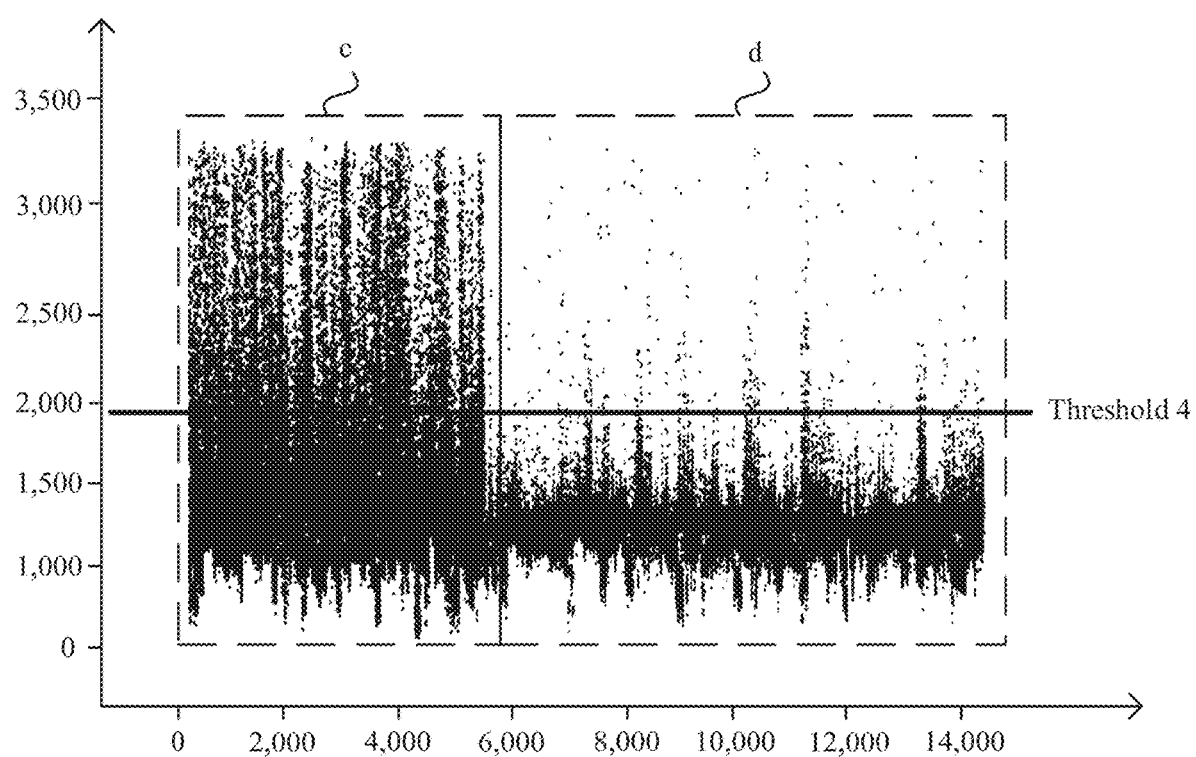
FIG. 10 is a diagram of manual ACC feature selection by using a threshold 4 according to an embodiment of this application.

For example, FIG. 9 and FIG. 10 are diagrams of manual selection on another ACC feature.

It is assumed that a horizontal axis represents a serial number of a data feature, and a vertical axis represents a value of the data feature. A plurality of knuckle feature points (that is, ACC feature points) are surrounded by a dashed box c, and a plurality of non-knuckle feature points are surrounded by a dashed box d. Value distributions of the knuckle feature points and the non-knuckle feature points partly overlap.

As shown in FIG. 9, if a preset threshold is set to a threshold 3, and a selection rule is to filter out a feature point less than the threshold 3, an electronic device filters out a few non-knuckle feature points less than the threshold 3. However, in this case, a lot of non-knuckle feature points still remain, and a lot of invalid non-knuckle feature points are input into a classification model, causing an inaccurate classification result that is finally obtained.

As shown in FIG. 10, if a preset threshold is set to a threshold 4, where the threshold 4 is greater than the threshold 3, and a selection rule is to filter out a feature point less than the threshold 4, an electronic device filters out a lot of non-knuckle feature points less than the threshold 4. However, some knuckle feature points less than the threshold 4 is also filtered out, and some valid knuckle feature points are filtered out. As a result, a classification model cannot perform accurate classification due to insufficient valid data.

According to the descriptions in the foregoing embodiments, it can be learned that, on one hand, the manual selection manner relies too much on subjective commissioning, requiring a lot of time for testing a threshold and resulting in higher work complexity. On the other hand, when value distributions of the knuckle feature points and the non-knuckle feature points are approximate to each other or partly overlap, even if a threshold is adjusted, it is difficult to filter out most non-knuckle feature points and remain most knuckle feature points, causing an inaccurate classification result that is finally obtained.

To resolve the foregoing problem of the foregoing two algorithms, in embodiments of this application, the two algorithms are improved, and a new knuckle operation identification method is provided. In the method, a manually-set preset threshold in the foregoing two algorithms is canceled, and an ACC feature is classified by using an ACC binary classification model. In other words, a manual selection manner is replaced with a machine selection manner. In addition, in the method, a CAP binary classification model is added, to extract a confidence score from a CAP signal. In addition, in the method, feature fusion is performed on the confidence score, the ACC feature, and a touch feature, to estimate a final classification result.

It should be noted that, the knuckle operation identification method provided in embodiments of this application may be applied to various electronic devices.

An electronic device may be a mobile phone, a tablet computer, a wearable device, a vehicle-mounted device, an augmented reality (AR) device, a virtual reality (VR) device, a laptop computer, an ultra-mobile personal computer (UMPC), a netbook, a personal digital assistant (PDA), a smart screen, or the like; or may be another device or apparatus disposed with a touch panel. A specific type of the electronic device is not limited at all in embodiments of this application.

To more clearly illustrate the improved knuckle operation identification method, the following describes the method in detail with two parts.

In a first part, a principle of the new knuckle operation identification method provided in embodiments of this application is described.

Usually, an accelerometer is disposed on an upper left corner of a touch panel based on operation habits of most users. When a user uses a knuckle to touch or knock on different touch regions of the touch panel, manners in which the accelerometer bears stress are different, and the accelerometer acquires different ACC data. For example, FIG. 11 to FIG. 18 show four scenarios in which a knuckle performs an operation on different touch regions.

Scenario 1

Figure 11:
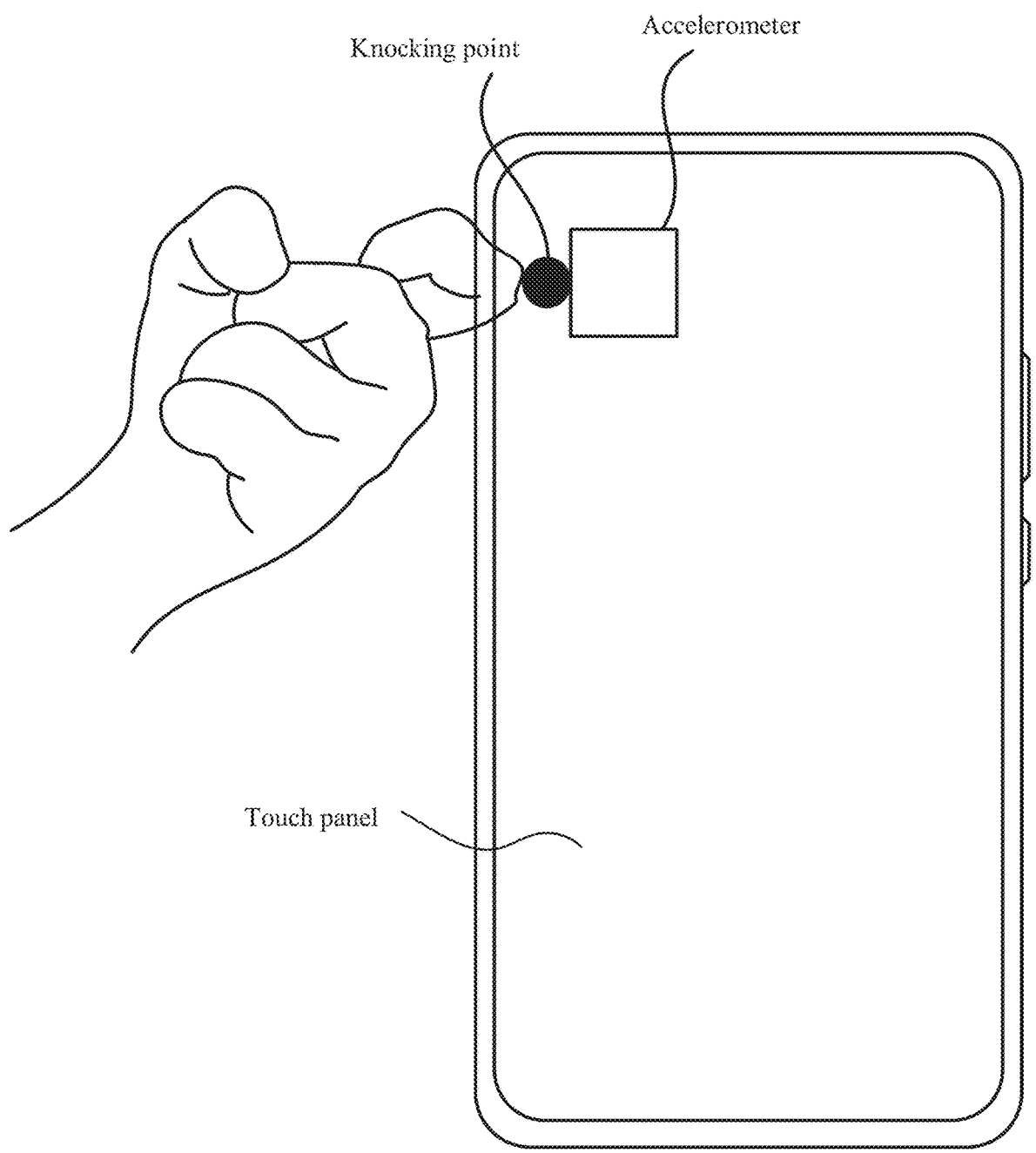
FIG. 11 is a front view of knocking on an upper left part of a screen with a knuckle of an index finger according to an embodiment of this application.
Figure 12:
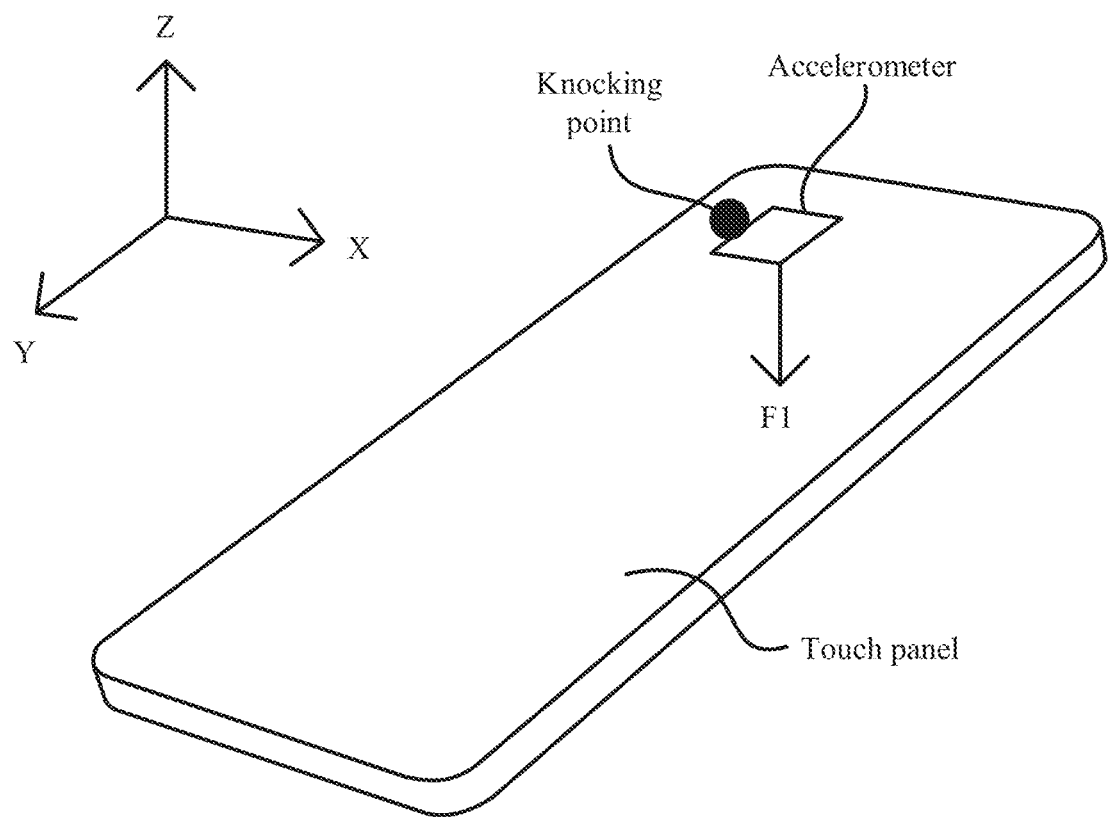
FIG. 12 is an oblique view of knocking on an upper left part of a screen with a knuckle of an index finger according to an embodiment of this application.

FIG. 11 is a front view of knocking on an upper left part of a screen with a knuckle of an index finger. FIG. 12 is an oblique view of knocking on an upper left part of a screen with a knuckle of an index finger. It is assumed that an x-axis is a horizontal direction of a plane on which a touch panel is located, a y-axis is a vertical direction of the plane on which the touch panel is located, and a z-axis is a direction perpendicular to the touch panel. As shown in FIG. 11 and FIG. 12, when the knuckle of the index finger knocks on the upper left part of the screen, an accelerometer at the upper left part of the touch panel obtains a mechanical force F1 in a negative direction of the z-axis.

Scenario 2

Figure 13:
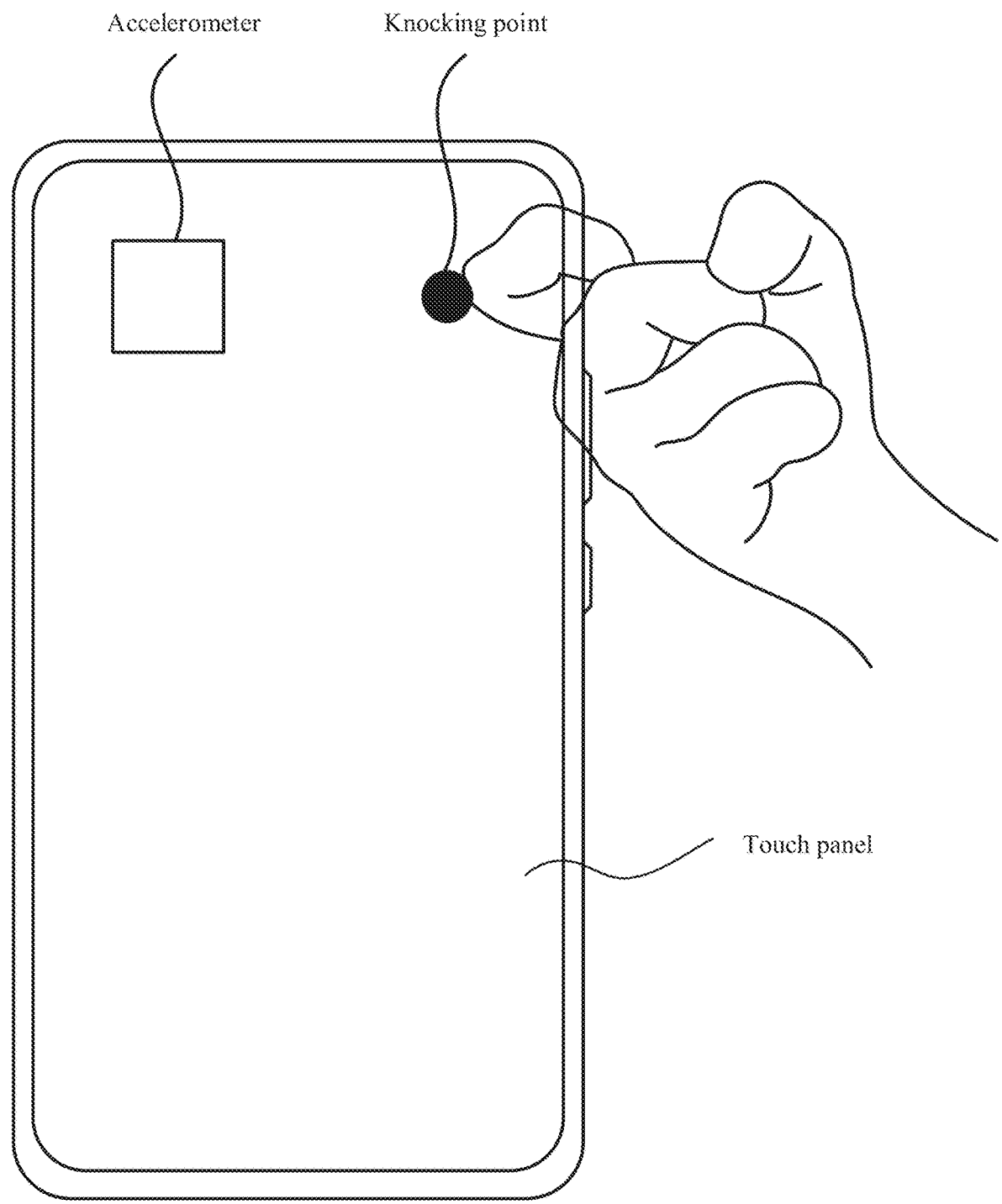
FIG. 13 is a front view of knocking on an upper right part of a screen with a knuckle of an index finger according to an embodiment of this application.
Figure 14:
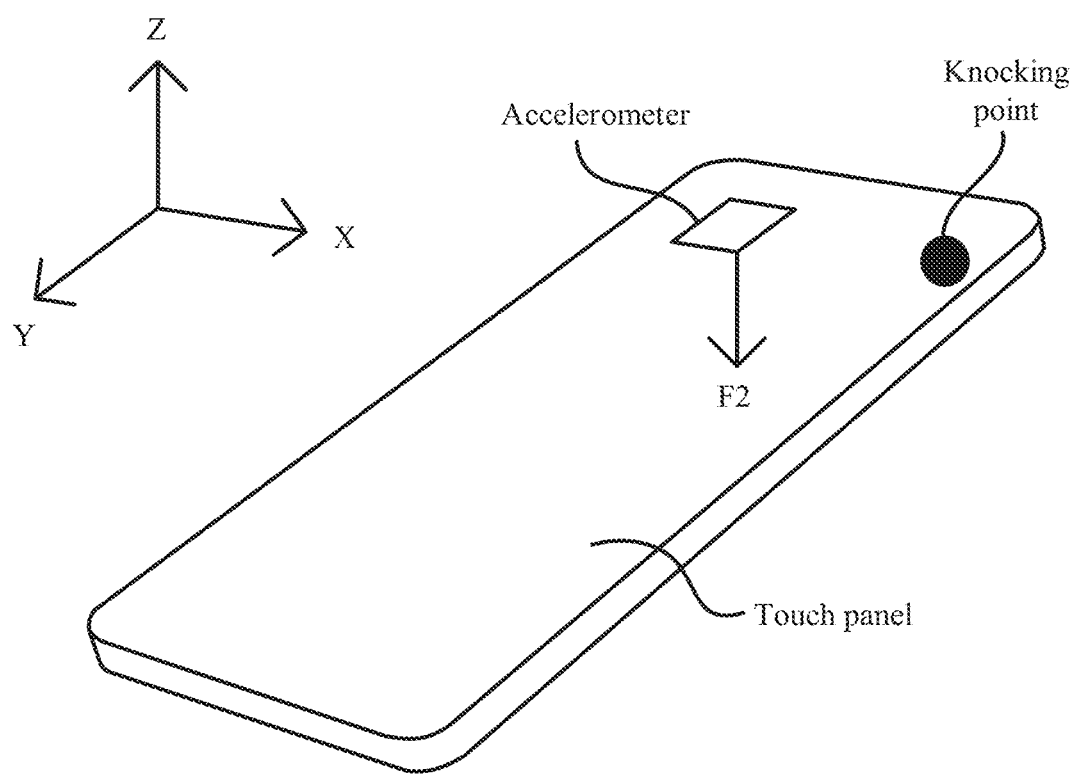
FIG. 14 is an oblique view of knocking on an upper right part of a screen with a knuckle of an index finger according to an embodiment of this application.

FIG. 13 is a front view of knocking on an upper right part of a screen with a knuckle of an index finger. FIG. 14 is an oblique view of knocking on an upper right part of a screen with a knuckle of an index finger. It is assumed that an x-axis is a horizontal direction of a plane on which a touch panel is located, a y-axis is a vertical direction of the plane on which the touch panel is located, and a z-axis is a direction perpendicular to the touch panel. As shown in FIG. 13 and FIG. 14, when the knuckle of the index finger knocks on the upper right part of the screen, an accelerometer at the upper left part of the touch panel obtains a mechanical force F2 in a negative direction of the z-axis.

Scenario 3

Figure 15:
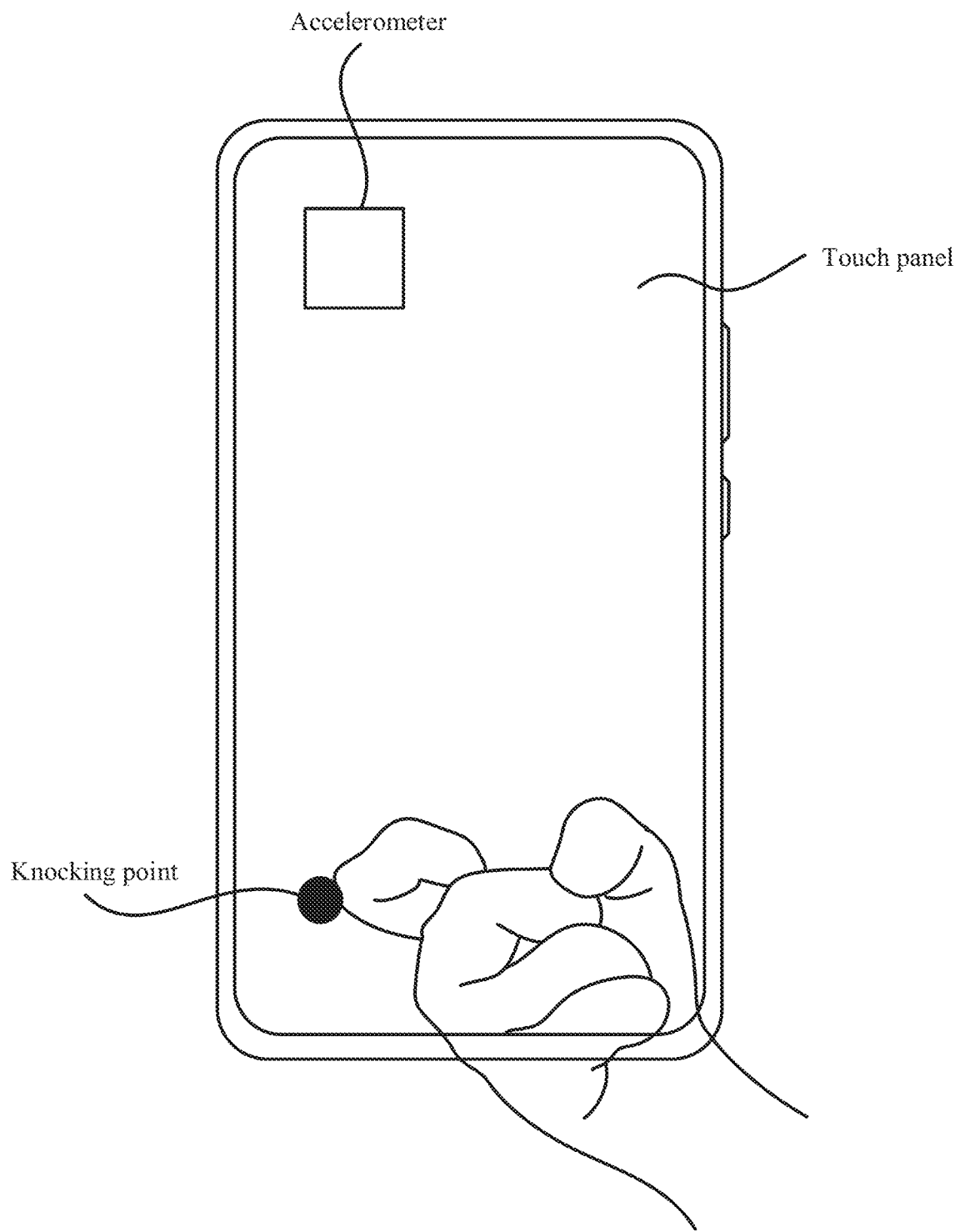
FIG. 15 is a front view of knocking on a lower left part of a screen with a knuckle of an index finger according to an embodiment of this application.
Figure 16:
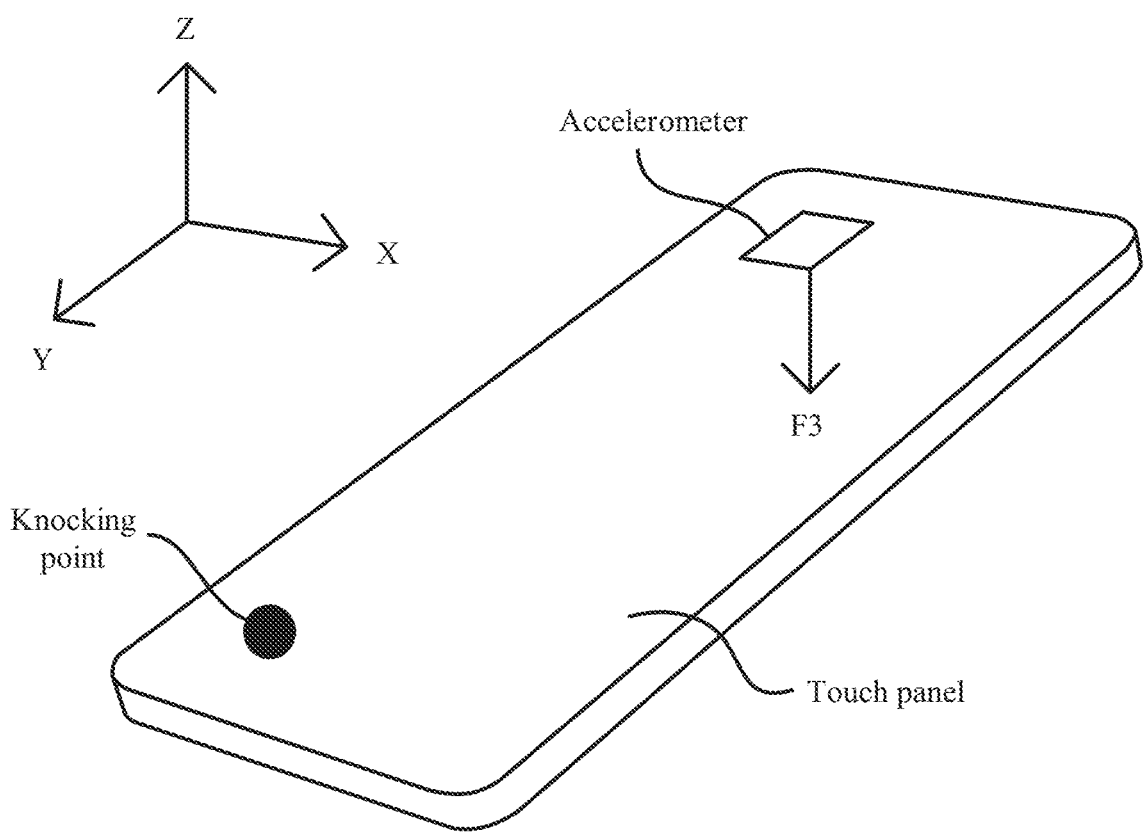
FIG. 16 is an oblique view of knocking on a lower left part of a screen with a knuckle of an index finger according to an embodiment of this application.

FIG. 15 is a front view of knocking on a lower left part of a screen with a knuckle of an index finger. FIG. 16 is an oblique view of knocking on a lower left part of a screen with a knuckle of an index finger. It is assumed that an x-axis is a horizontal direction of a plane on which a touch panel is located, a y-axis is a vertical direction of the plane on which the touch panel is located, and a z-axis is a direction perpendicular to the touch panel. As shown in FIG. 15 and FIG. 16, when the knuckle of the index finger knocks on the lower left part of the screen, an accelerometer at the upper left part of the touch panel obtains a mechanical force F3 in a negative direction of the z-axis.

Scenario 4

Figure 17:
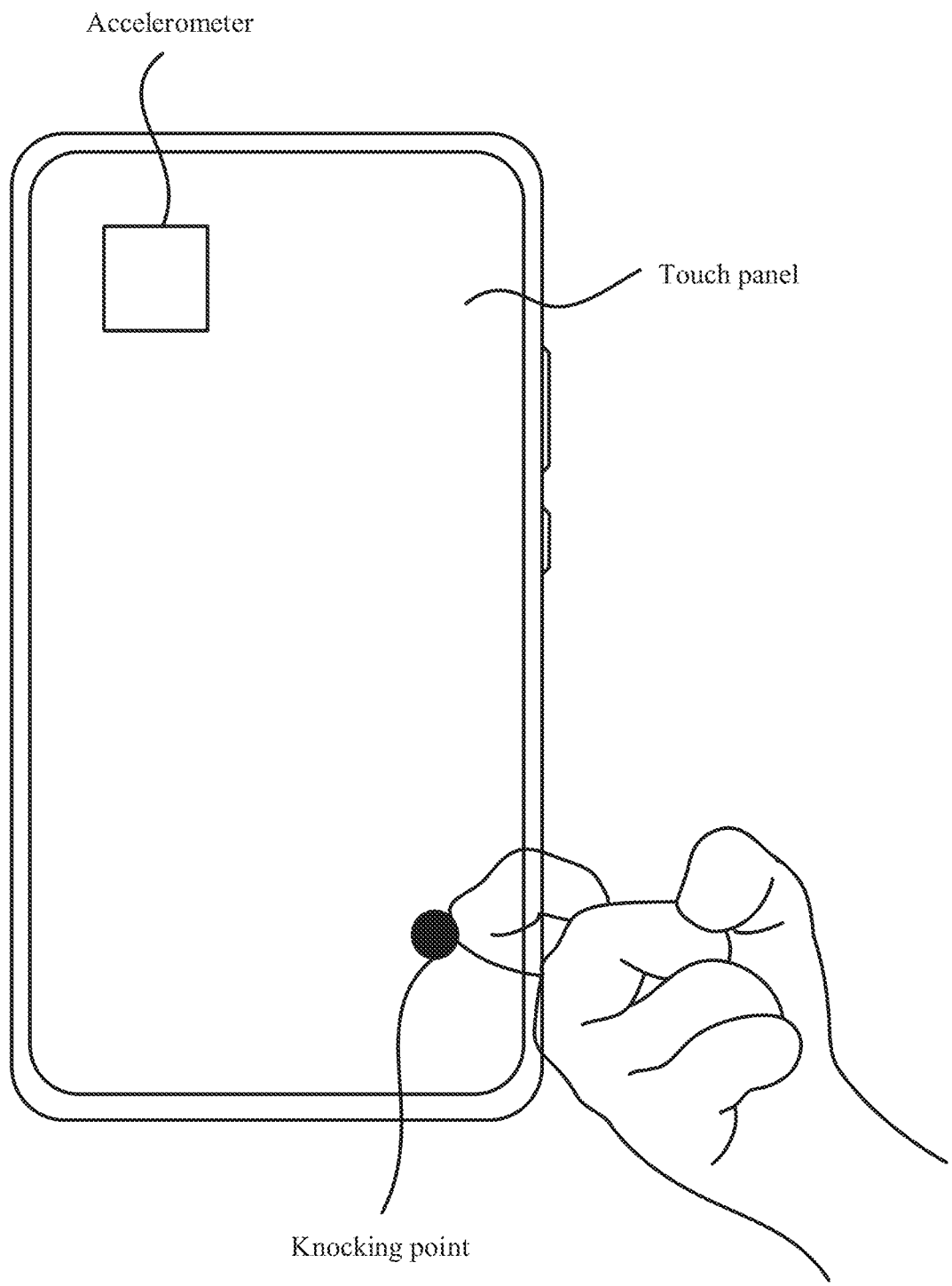
FIG. 17 is a front view of knocking on a lower right part of a screen with a knuckle of an index finger according to an embodiment of this application.
Figure 18:
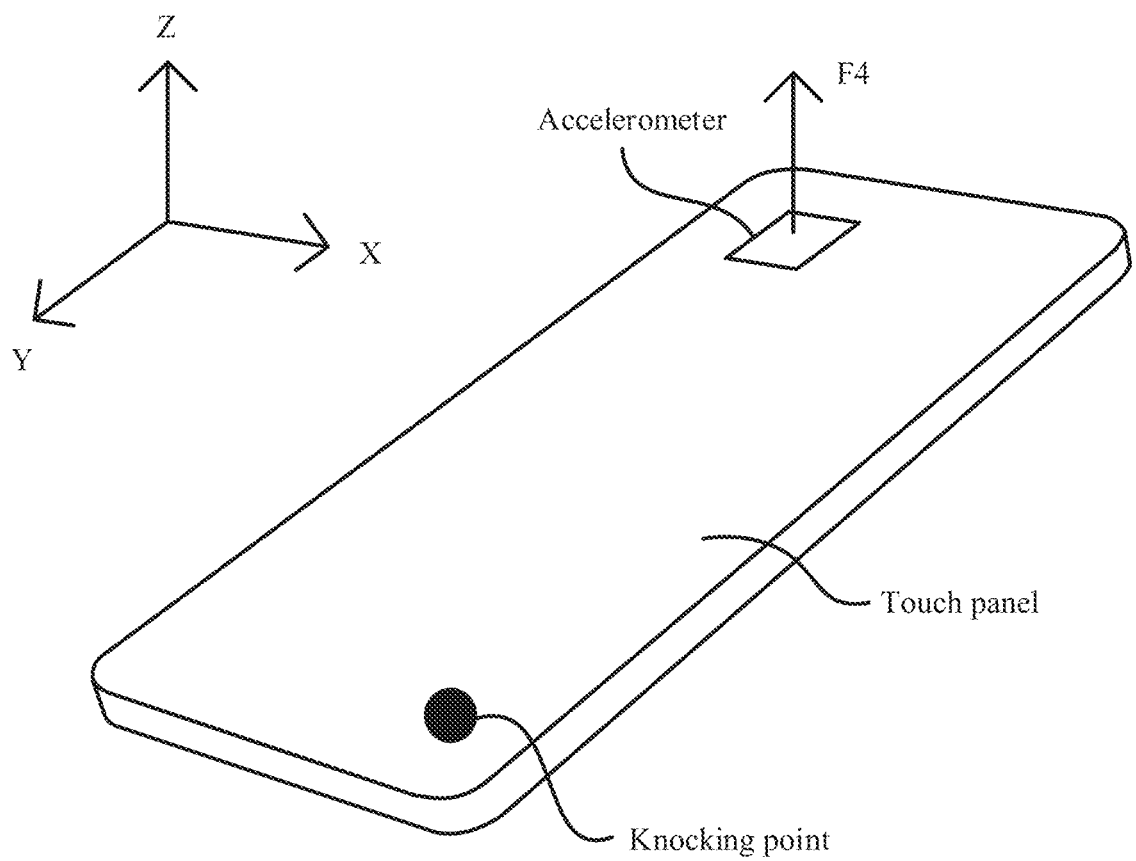
FIG. 18 is an oblique view of knocking on a lower right part of a screen with a knuckle of an index finger according to an embodiment of this application.

FIG. 17 is a front view of knocking on a lower right part of a screen with a knuckle of an index finger. FIG. 18 is an oblique view of knocking on a lower right part of a screen with a knuckle of an index finger. It is assumed that an x-axis is a horizontal direction of a plane on which a touch panel is located, a y-axis is a vertical direction of the plane on which the touch panel is located, and a z-axis is a direction perpendicular to the touch panel. As shown in FIG. 17 and FIG. 18, when the knuckle of the index finger knocks on the lower right part of the screen, an accelerometer at the upper left part of the touch panel obtains a mechanical force F4 in a positive direction of the z-axis.

According to the descriptions of the foregoing four scenarios, it can be learned that, regardless of a specific touch region of the touch panel on which a knuckle performs an operation, the accelerometer is mainly affected by a mechanical force in a direction of the z-axis.

Figure 19:
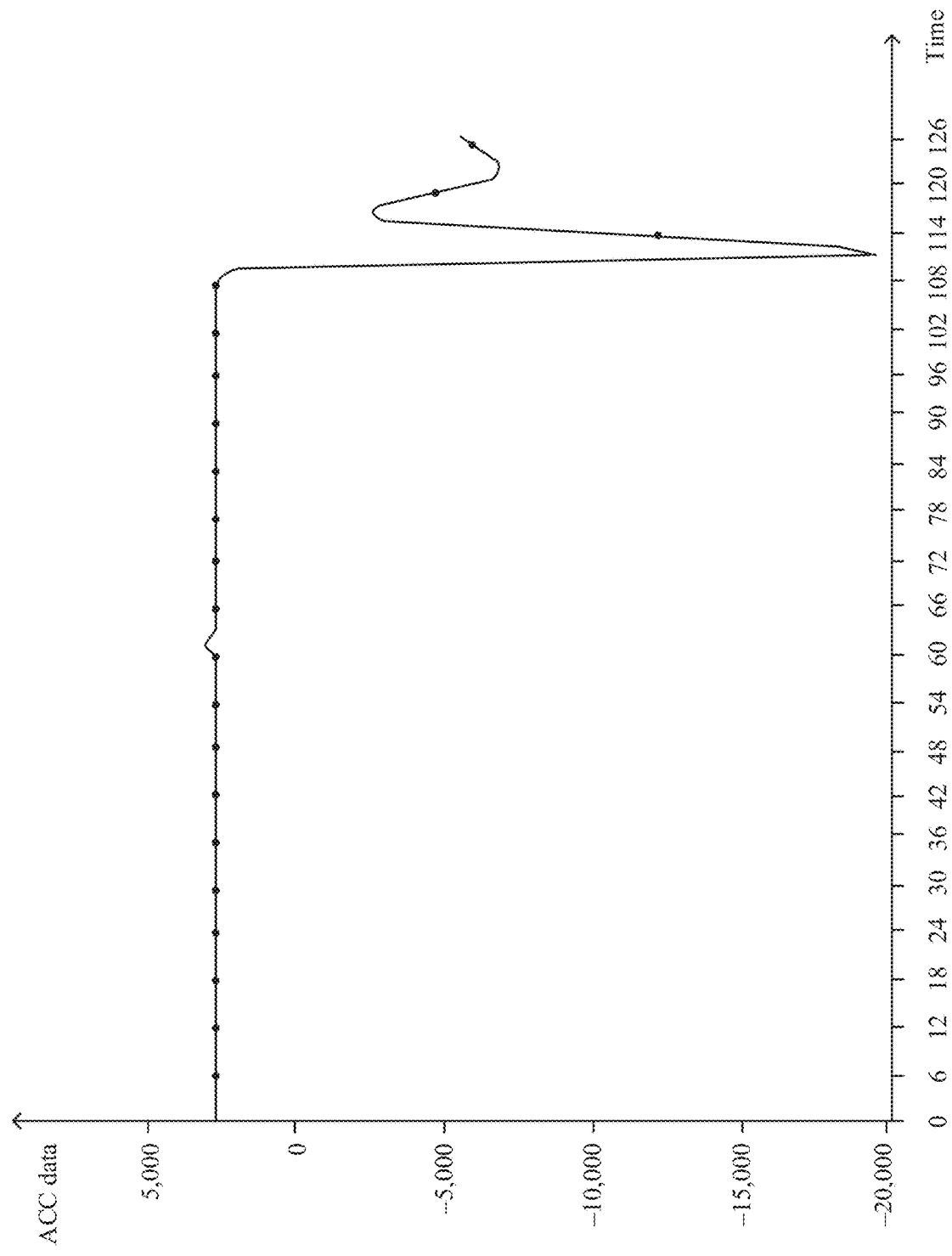
FIG. 19 is a diagram of an ACC signal change trend according to an embodiment of this application.
Figure 20:
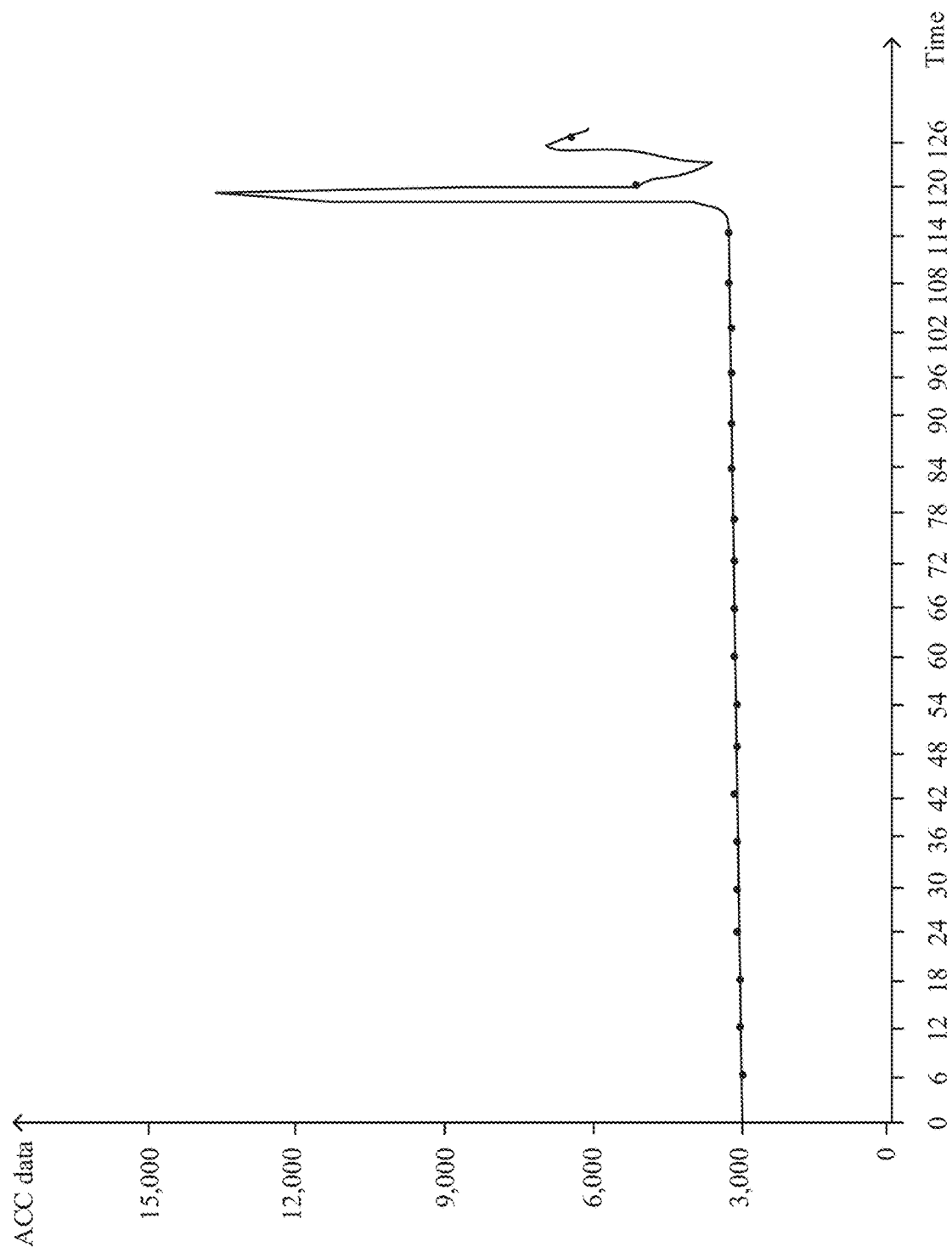
FIG. 20 is a diagram of another ACC signal change trend according to an embodiment of this application.

For example, ACC data indicates acceleration of an ACC signal in the direction of the z-axis. FIG. 19 and FIG. 20 are diagrams of change trends of two types of ACC signals. A horizontal axis represents time, and a vertical axis represents a value of the ACC data.

As shown in FIG. 19, before a knuckle performs an operation on a touch panel, the value of the ACC data stays mostly at 2500 from a moment corresponding to $0^{th}$-frame data to a moment corresponding to $108^{th}$-frame data. After the knuckle performs an operation on an upper region or a left region, for example, an upper left region, an upper right region, or a lower left region, of the touch panel, the value of the ACC data undergoes a process of significant decreases from the moment corresponding to the $108^{th}$-frame data to a moment corresponding to $128^{th}$-frame data.

As shown in FIG. 20, before a knuckle performs an operation on a touch panel, the value of the ACC data stays mostly at 3000 from a moment corresponding to $0^{th}$-frame data to a moment corresponding to $114^{th}$-frame data. After the knuckle performs an operation on a lower right region of the touch panel, the value of the ACC data undergoes a process of significant increases from the moment corresponding to the $114^{th}$-frame data to a moment corresponding to $128^{th}$-frame data.

With reference to the descriptions in the foregoing embodiments, when a knuckle performs an operation on different touch regions of the touch panel, the ACC data may have different change trends. Therefore, in embodiments of this application, it is proposed to extract a touch feature from a touch signal for determining a contact area and a contact location, and to extract an ACC feature from an ACC signal for determining a magnitude of a touch on a screen. In addition, a CAP binary classification model is used at the front, to extract a confidence score indicating a correlation to a knuckle from a CAP signal. Finally, feature fusion is performed on the ACC feature, the confidence score, and the touch feature, to obtain a better classification effect.

In a second part, a procedure in the improved knuckle operation identification method provided in embodiments of this application is described in detail.

Figure 21:
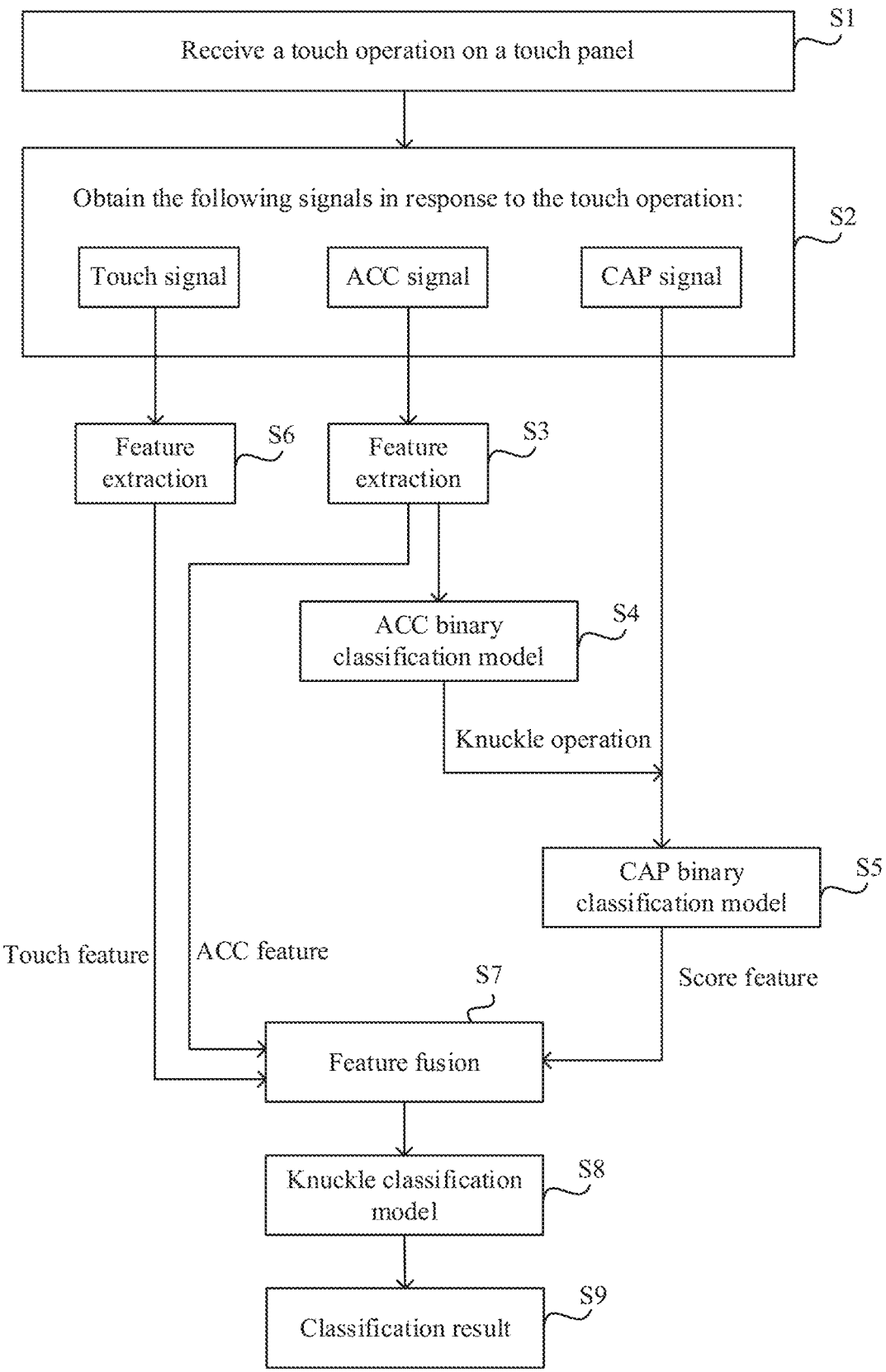
FIG. 21 is a schematic flowchart of an improved knuckle operation identification method according to an embodiment of this application.

FIG. 21 is a schematic flowchart of an improved knuckle operation identification method according to an embodiment of this application. The method may be applied to a scenario of knuckle interaction manner identification. The method may be performed by an electronic device, or a functional module in the electronic device. A screen of the electronic device is a touch panel, and an ACC sensor and a CAP sensor are disposed in the touch panel.

As shown in FIG. 21, the method may include the following steps S1 to S9.

S1: Receive a touch operation on a touch panel.

When a body part, for example, a palm, a finger pulp, a fingertip, a finger nail, a lateral nail, or a knuckle of a user performs an operation on the touch panel, a sensor of an electronic device detects a touch operation. As the touch operation may be a knuckle operation, or may be a non-knuckle operation, the electronic device may determine whether the touch operation is a knuckle operation through the following S2 to S9, to perform a corresponding responsive operation.

S2: Obtain an ACC signal, a CAP signal, and a touch signal in response to the touch operation.

The sensor of the electronic device may acquire data periodically. When the electronic device receives the touch operation on the touch panel, the electronic device may obtain, in response to the touch operation, the ACC signal acquired by the ACC sensor, the CAP signal acquired by the CAP sensor, and the touch signal obtained by processing the CAP signal.

The ACC signal is a raw signal acquired by the ACC sensor and may indicate a motion/stationary state of the electronic device because of a mechanical force. The CAP signal is a raw signal acquired by the CAP sensor, and the raw signal carries capacitance information of a capacitor node. The touch signal is a signal obtained by processing the CAP signal and may indicate a touch feature when a body part of a user comes in contact with the touch panel.

For these three types of signals, refer to specific descriptions in the foregoing embodiments. Details are not provided herein again.

It should be noted that, the ACC signal, the CAP signal, and the touch signal may be time domain signals, or may be frequency domain signals.

S3: Extract an ACC feature from the ACC signal.

The ACC feature is a feature, in the ACC signal, associated with a knuckle touch operation, and may be used to determine a magnitude of a force when a body part performs an operation on the touch panel.

In embodiments of this application, the electronic device may extract the ACC feature from the ACC signal by using a preset feature extraction algorithm. For example, the feature extraction algorithm may be a method based on mutual information, a method based on maximum relevance-minimum maximum redundancy, a wrapper (Wrapper) feature selection method, or the like.

For example, the ACC feature may include at least one of the following: a maximum gradient (maxgradient) feature, a signal amplitude (amplitude) feature, a front-part zero cross counting (zerocrosscnt) feature, a maximum high pass (maxhighpass) feature, a mean-add-absolute-value (meanaddmax) feature, a front-part normalized value square error (accnormsquare) feature, a front-part normalized value amplitude (accnormsquare) feature, a fast Fourier transform mean (fast Fourier transformfft mean, fftmean) feature, and a part fast Fourier transform mean (part fftmean, partfftmean) feature. It should be understood that, the ACC feature may include another feature. This is not limited in embodiments of this application.

S4: Input the ACC feature into an ACC binary classification model.

The ACC binary classification model is used for binary classification based on the extracted ACC feature to obtain two classification results.

One classification result is that the touch operation on the touch panel is a knuckle touch operation.

The other classification result is that the touch operation on the touch panel is a non-knuckle touch operation.

If an output result of the ACC binary classification model is that the touch operation on the touch panel is a knuckle touch operation, the following S5 is performed.

If an output result of the ACC binary classification model is that the touch operation on the touch panel is a non-knuckle touch operation, no processing is performed, or a responsive function corresponding to the non-knuckle touch operation is performed.

S5: Input the CAP signal into a CAP binary classification model to obtain a confidence score.

The confidence score may indicate a degree of association between the CAP signal and a knuckle operation. In other words, the confidence score is a feature, in the CAP signal, associated with the knuckle operation.

As a raw signal acquired by the CAP sensor, and the CAP signal carries capacitance information of a capacitor node. With reference to the descriptions in the foregoing embodiments, when a body part comes in contact with the touch panel, a change of a value of a capacitance of the capacitor node is caused. It should be understood that, when a user uses different body parts to touch the touch panel, with different gestures, different capacitor nodes are touched, and there are different changes of values of capacitances.

For example, FIG. 22 is a diagram of a group of 7*7 node matrices respectively corresponding to a knuckle, a fingertip, and a finger pulp. As shown in FIG. 22, values of capacitances of largest capacitor nodes in the 7*7 node matrices are different from each other, and values of capacitances of capacitor nodes around the largest capacitor nodes are also different from each other. After the CAP signal is input into the CAP binary classification model, the CAP binary classification model outputs an obtained score, that is, the confidence score, based on the capacitance information that is of the capacitor node and that is carried in the CAP signal. It should be understood that, in the 7*7 node matrix corresponding to a knuckle, a score is higher; and in the 7*7 node matrix corresponding to a fingertip or a finger pulp, a score is lower.

Table 1 is a table that provides a correspondence between an interaction manner and a score. As shown in Table 1, after the CAP signal is input into the CAP binary classification model, an output result of the CAP binary classification model is that a score is 0.92 when the touch operation on the touch panel is a knuckle touch operation, and that a score is 0.08 when the touch operation on the touch panel is a non-knuckle touch operation. It should be understood that, a higher score when the touch operation on the touch panel is a knuckle touch operation indicates a higher possibility that a finally obtained classification result is a knuckle touch operation after feature fusion is performed based on the score and the like. On the contrary, a lower score when the touch operation on the touch panel is a knuckle touch operation indicates a lower possibility that a finally obtained classification result is a knuckle touch operation after feature fusion is performed based on the score and the like.

TABLE 1

| Interaction manner | Score |
|---|---|
| Knuckle | 0.92 |
| Non-knuckle | 0.08 |

S6: Extract a touch feature from the touch signal. The touch feature may indicate a contact area and a contact location when a body part comes in contact with the touch panel. It should be understood that different gestures correspond to different touch features.

The electronic device may extract the touch feature from the touch signal by using a preset feature extraction algorithm. The touch feature may indicate a degree of association between the touch signal and a knuckle operation. In other words, the touch feature is a feature, in the touch signal, associated with the knuckle operation. For example, the touch feature may include a contact location (location) feature and/or a contact area (pressure) feature. The contact location feature may indicate a location of interaction between the body part and the touch panel, and the contact area feature may indicate a contact area of the body part with the touch panel.

It should be noted that, a concept of extracting the touch feature from the touch signal is proposed in the improved knuckle operation identification method in this application, which is different from direct threshold filtering on the touch signal in the foregoing two algorithms.

In a conventional manner, the electronic device usually uses an x coordinate and a y coordinate to indicate a specific location of a touch point on the touch panel. However, this manner of using coordinates to indicate a touch location has problems of a large amount of computations and proneness to user privacy leakage. To resolve such problems, an embodiment of this application provides a new concept, that is, a square coordinate number, to indicate an approximate location of the touch point on the touch panel.

Correspondingly, the location feature may be a square feature, and the square feature indicates a square coordinate number of the touch point.

Specifically, the electronic device may divide the touch panel into a grid of p rows and q columns based on resolution of the touch panel. Each square in the grid is represented by one square coordinate number. A length of each square is equal to a quantity of pixels on a vertical axis of the touch panel divided by p, and a width of each square is equal to a quantity of pixels on a horizontal axis of the touch panel divided by q. For example, if resolution of a screen of a mobile phone is 1,600*1,200 pixels, the screen is divided into a 4*3 grid. For another example, if resolution of a screen of a mobile phone is 1,920*1,080 pixels, the screen is divided into a 6*4 grid. p and q are positive integers.

With reference to the descriptions of FIG. 2 in the foregoing embodiment, because horizontal electrodes and vertical electrodes are perpendicular to each other on a display of the touch panel, a square indicated by each square coordinate number covers several electrode intersection points. When a knuckle causes coupling between two electrodes near a specific touch point, a value of a capacitance of a capacitor node changes, and an x coordinate and a y coordinate can be obtained from the touch signal, to further determine a square coordinate number of the touch point, that is, determine an approximate location of the touch point on the touch panel.

Figure 23:
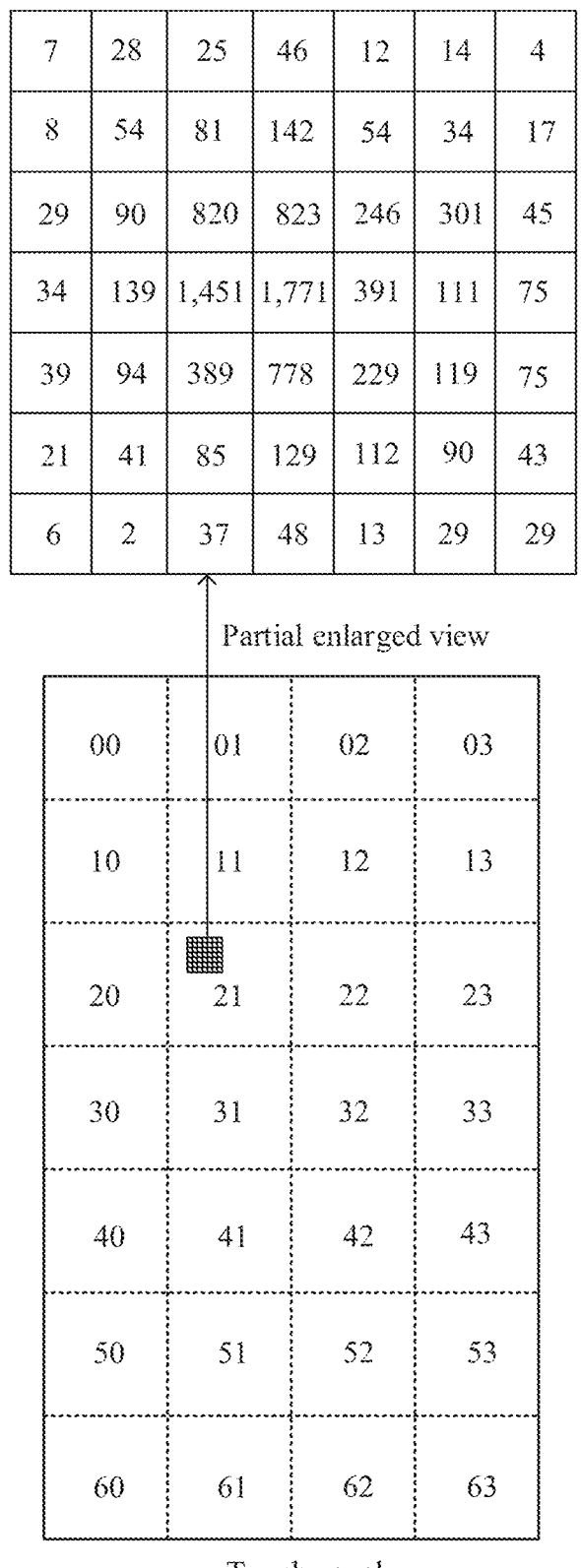
FIG. 23 is a diagram of a grid according to an embodiment of this application.

For example, FIG. 23 is a diagram of a grid according to an embodiment of this application. As shown in FIG. 23, the touch panel is divided into a grid of seven rows and four columns. Each square is represented by one square coordinate number. For example, from the top of the touch panel, square coordinate numbers of the first row of squares from left to right are sequentially 00, 01, 02, and 03; square coordinate numbers of the second row of squares from left to right are sequentially 10, 11, 12, and 13; square coordinate numbers of the third row of squares from left to right are sequentially 20, 21, 22, and 23; . . . ; and square coordinate numbers of the seventh row of squares from left to right are sequentially 60, 61, 62, and 63. When a knuckle knocks on a region corresponding to the square coordinate number 21, the electronic device may first obtain a CAP signal, where the CAP signal includes a value of a capacitance of each capacitor node in a 7*7 node matrix shown in a partial enlarged view; then process the CAP signal to obtain a touch signal; and then extract a square feature from the touch signal based on an x coordinate and a y coordinate of the touch signal, where the square feature indicates the square coordinate number 21 of the touch point. In other words, it is determined that the approximate location of the touch point on the touch panel is the region indicated by the square coordinate number 21.

It should be noted that, FIG. 23 is described by using an example in which the approximate location of the touch point on the touch panel is one square. This constitutes no limitation on embodiments of this application. During actual implementation, the touch point may cross a plurality of squares on the touch panel. In this case, the square feature may indicate square coordinate numbers of a plurality of squares or a square coordinate number of one square in a plurality of squares. A quantity of touch points included in the square is greater than a quantity of touch points included in another square.

In addition, an execution sequence of S3, S4, S5, and S6 is not limited in embodiments of this application.

In a first implementation, the electronic device may extract the ACC feature from the ACC signal while extracting the touch feature from the touch signal, and then determine, based on the output result of the ACC binary classification model whether to input the CAP signal into the CAP binary classification model, to perform feature fusion on the plurality of extracted features. In other words, S3 and S6 are performed before S4 and S5 are performed.

In a second implementation, the electronic device may first extract the ACC feature from the ACC signal, and then if the output result of the ACC binary classification model indicates that the touch operation on the touch panel is a knuckle touch operation, input the CAP signal into the CAP binary classification model and extract the touch feature from the touch signal, to perform feature fusion on the plurality of extracted features. In other words, S3 and S4 are performed before S5 and S6 are performed.

It should be understood that, compared with the first implementation, in the second implementation, when the output result of the ACC binary classification model indicates that the touch operation on the touch panel is a non-knuckle touch operation, the touch feature does not need to be extracted from the touch signal. For this case, an amount of computations of the electronic device can be reduced to some degree.

S7: Perform feature fusion on the extracted ACC feature, confidence score, and touch feature.

After the ACC feature, the confidence score, and the touch feature are extracted, the electronic device may perform feature concatenation on the features by using a preset feature fusion algorithm. For example, the preset feature fusion algorithm may be an early fusion (early fusion) algorithm, a late fusion (late fusion) algorithm, or the like.

Figure 24:
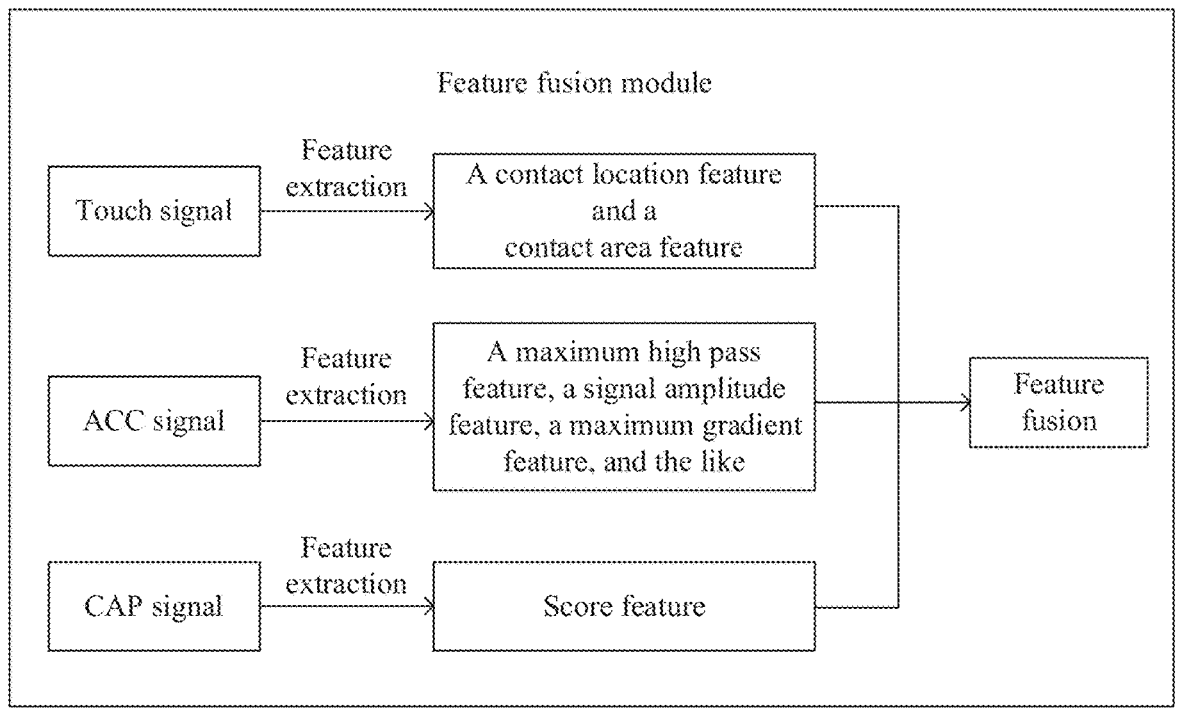
FIG. 24 is a diagram of feature fusion according to an embodiment of this application.

For example, as shown in FIG. 24, the electronic device may include a feature fusion module. It is assumed that the electronic device extracts the contact location feature and the contact area feature from the touch signal, extracts the maximum gradient (maxgradient) feature, the signal amplitude (amplitude) feature, the front-part zero cross counting (zerocrosscnt) feature, the maximum high pass (maxhighpass) feature, the mean-add-absolute-value (meanaddmax) feature, the front-part normalized value square error (accnormsquare) feature, the front-part normalized value amplitude (accnormsquare) feature, the fast Fourier transform mean (fast Fourier transformfft mean, fftmean) feature, and the part fast Fourier transform mean (part fftmean, partfftmean) feature from the ACC signal, and extracts the confidence score from the CAP signal. The feature fusion module may perform feature fusion on the 12 features to obtain a fused feature.

S8: Input the fused feature into a knuckle classification model.

The knuckle classification model estimates whether the touch operation is a knuckle interaction manner based on the fused feature.

The improved knuckle operation identification method provided in embodiments of this application involves three types of binary classification models: the ACC binary classification model, the CAP binary classification model, and the knuckle classification model. The three types of binary classification models may be conventional machine learning models or neural network models.

In some embodiments, as the confidence score similar to a single-channel image is extracted from the CAP signal, the CAP binary classification model may be a convolutional neural network (CNN) model. A CNN is an artificial neural network.

Figure 25:
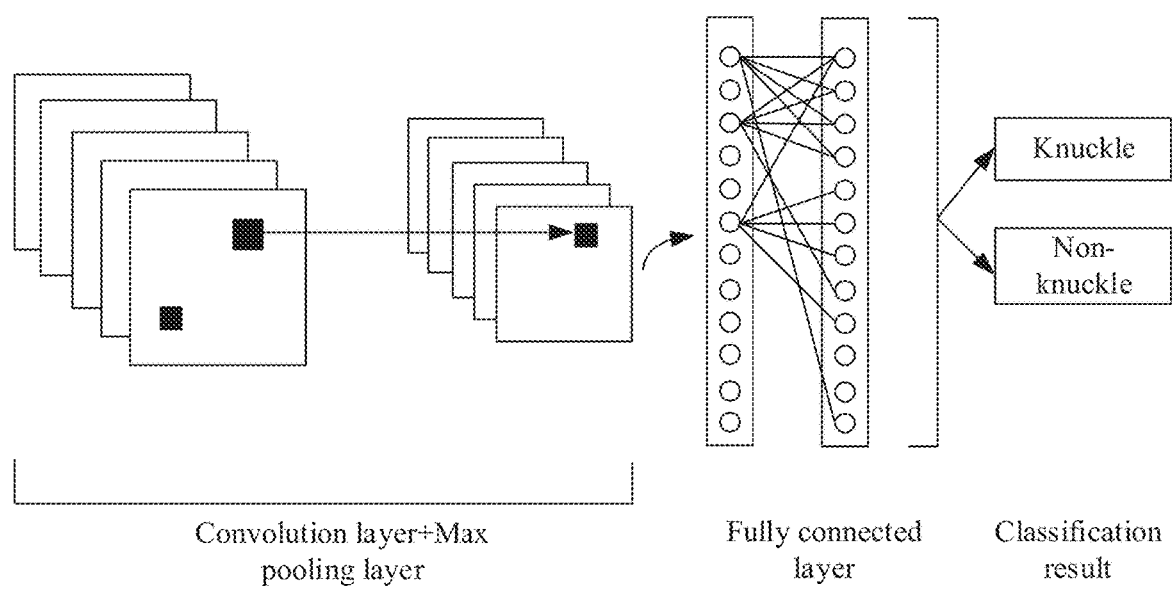
FIG. 25 is a diagram of a CAP binary classification model according to an embodiment of this application.

For example, the CAP binary classification model may be shown in FIG. 25, and a structure of the CNN is divided into three layers: a convolutional layer, mainly used for extracting the CAP feature; a max pooling layer, mainly used for down sampling, without damaging an identification result; and a fully connected layer, mainly used for classification, to determine whether the touch operation is a knuckle operation or a non-knuckle operation.

In some embodiments, an example in which nine ACC features are extracted from the ACC signal and two touch features are extracted from the touch signal is used. Because the ACC binary classification model needs to process only nine features and the knuckle classification model needs to process only 12 features, an amount of computations is relatively small. Therefore, the ACC binary classification model and the knuckle classification model may be fully connected neural network (fully connected neural network, DNN) models. The DNN model is a multilayer perceptron. A principle of the perceptron is to find the most appropriate and the most robust hyperplane among classes. The most representative perceptron is a support vector machine (SVM) algorithm.

Figure 26:
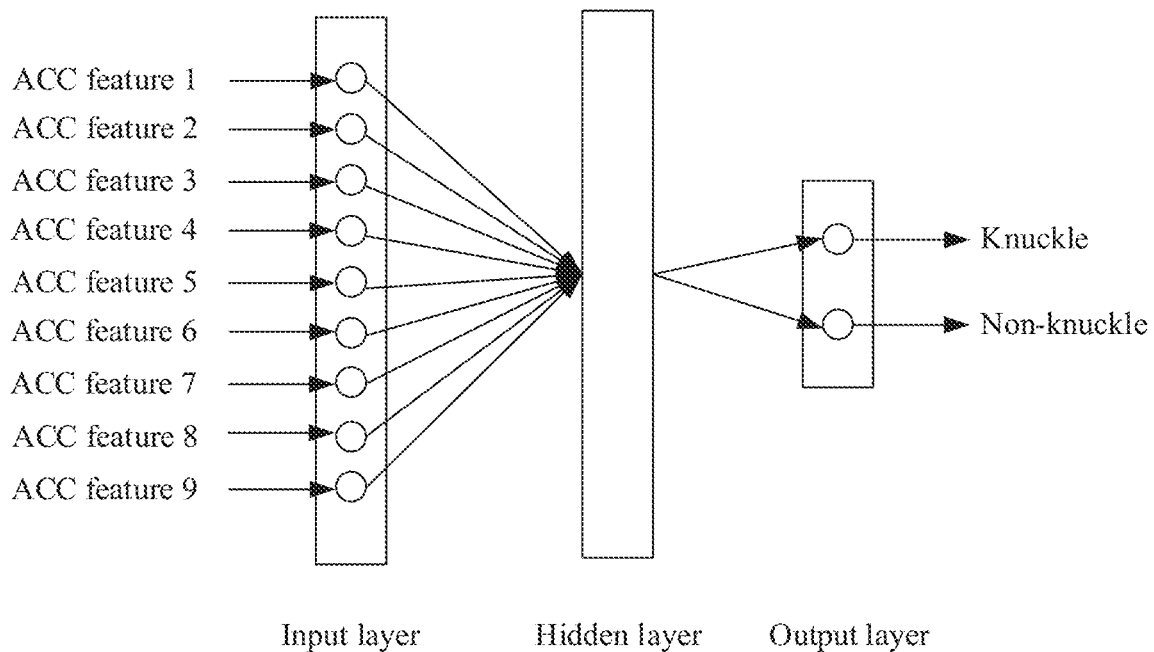
FIG. 26 is a diagram of an ACC binary classification model according to an embodiment of this application.
Figure 27:
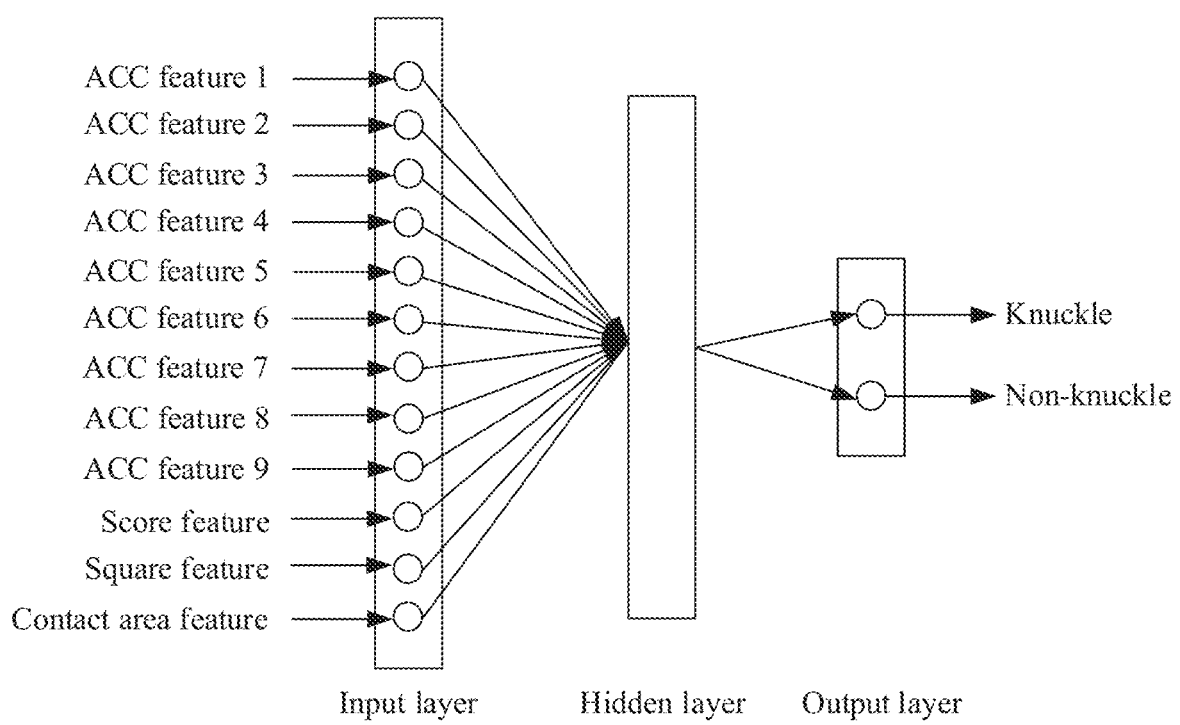
FIG. 27 is a diagram of a knuckle classification model according to an embodiment of this application.

For example, the ACC binary classification model may be shown in FIG. 26, and the knuckle classification model may be shown in FIG. 27. The two DNN models each include an input layer, a hidden layer, and an output layer. There may be a plurality of hidden layers. It should be understood that, more hidden layers can better separate features of data, but having too many hidden layers results in more time for training and overfitting. As shown in FIG. 26 and FIG. 27, nine ACC features are input into the input layer of the ACC binary classification model, and nine ACC features, one confidence score, and two touch features (the square feature and the contact area feature) are input into the input layer of the knuckle classification model.

It should be noted that, for a training process of the ACC binary classification model, the CAP binary classification model, and the knuckle classification model, refer to a conventional technology. Details are not provided herein.

S9: Obtain a classification result of the knuckle classification model.

The knuckle classification model is used for binary classification based on the fused feature to obtain two classification results.

One classification result is that the touch operation on the touch panel is a knuckle touch operation. In other words, a gesture interaction manner identified by the knuckle classification model is specifically a knuckle interaction manner.

The other classification result is that the touch operation on the touch panel is a non-knuckle touch operation. In other words, a gesture interaction manner identified by the knuckle classification model is specifically a non-knuckle interaction manner.

If an output result of the knuckle classification model indicates that the touch operation on the touch panel is a knuckle touch operation, the electronic device may perform a responsive function corresponding to the knuckle touch operation.

If an output result of the knuckle classification model indicates that the touch operation on the touch panel is a non-knuckle touch operation, the electronic device may perform no processing or perform a responsive function corresponding to the non-knuckle touch operation.

In some embodiments, a plurality of types of knuckle gestures may be set on the electronic device. After the knuckle interaction manner is identified, the electronic device may determine, based on a location at which a knuckle touches the touch panel, duration of a touch of the knuckle on the touch panel, a distance that a user swipes the knuckle on the touch panel, and the like, which type of knuckle gestures the knuckle interaction manner belongs to, and perform a responsive function corresponding to a knuckle gesture.

For example, the knuckle gesture includes at least one of the following: a gesture of knocking twice with a knuckle, a gesture of knocking and drawing an enclosed region with a knuckle, a gesture of knocking with a knuckle and drawing a letter S, a gesture of swiping down on a screen from top to bottom with three knuckles, a gesture of knocking twice with two knuckles, and a gesture of knocking and drawing a straight line in the middle of the screen with a knuckle.

Correspondingly, the gesture of knocking twice with a knuckle corresponds to a function of taking a full screenshot, the gesture of knocking and drawing an enclosed region with a knuckle corresponds to a function of capturing part of the screen, the gesture of knocking with a knuckle and drawing a letter S corresponds to a function of taking a scrollshot, the gesture of swiping down on a screen from top to bottom with three knuckles corresponds to a function of swiping to take a screenshot, the gesture of knocking twice with two knuckles corresponds to a function of starting or ending screen recording, and the gesture of knocking and drawing a straight line in the middle of the screen with a knuckle corresponds to a function of screen splitting.

In the knuckle operation identification method provided in embodiments of this application, a manually-set threshold is canceled and the ACC feature is classified by using the ACC binary classification model. In other words, a manual selection manner is replaced with a machine selection manner, to improve ACC feature selection efficiency and improve a selection effect. In addition, as one CAP binary classification model is added, the confidence score can be extracted from the CAP signal, and feature fusion is performed on the confidence score, the ACC feature, and the touch feature. The fused feature is finally used for classification, and a better classification effect can be achieved.

It should be noted that, in embodiments of this application, in different experiment scenarios, a knuckle operation and a non-knuckle operation are identified by using an original identification method and the improved identification method separately. Numerous experimental results show that a knuckle operation identification rate of the improved identification method is higher than a knuckle operation identification rate of the original identification method, and that a non-knuckle operation false touch rate of the improved identification method is lower than a non-knuckle operation false touch rate of the original identification method. In other words, the improved identification method improves the knuckle operation identification rate and reduces the non-knuckle operation false touch rate, achieving a better classification effect.

Figure 28:
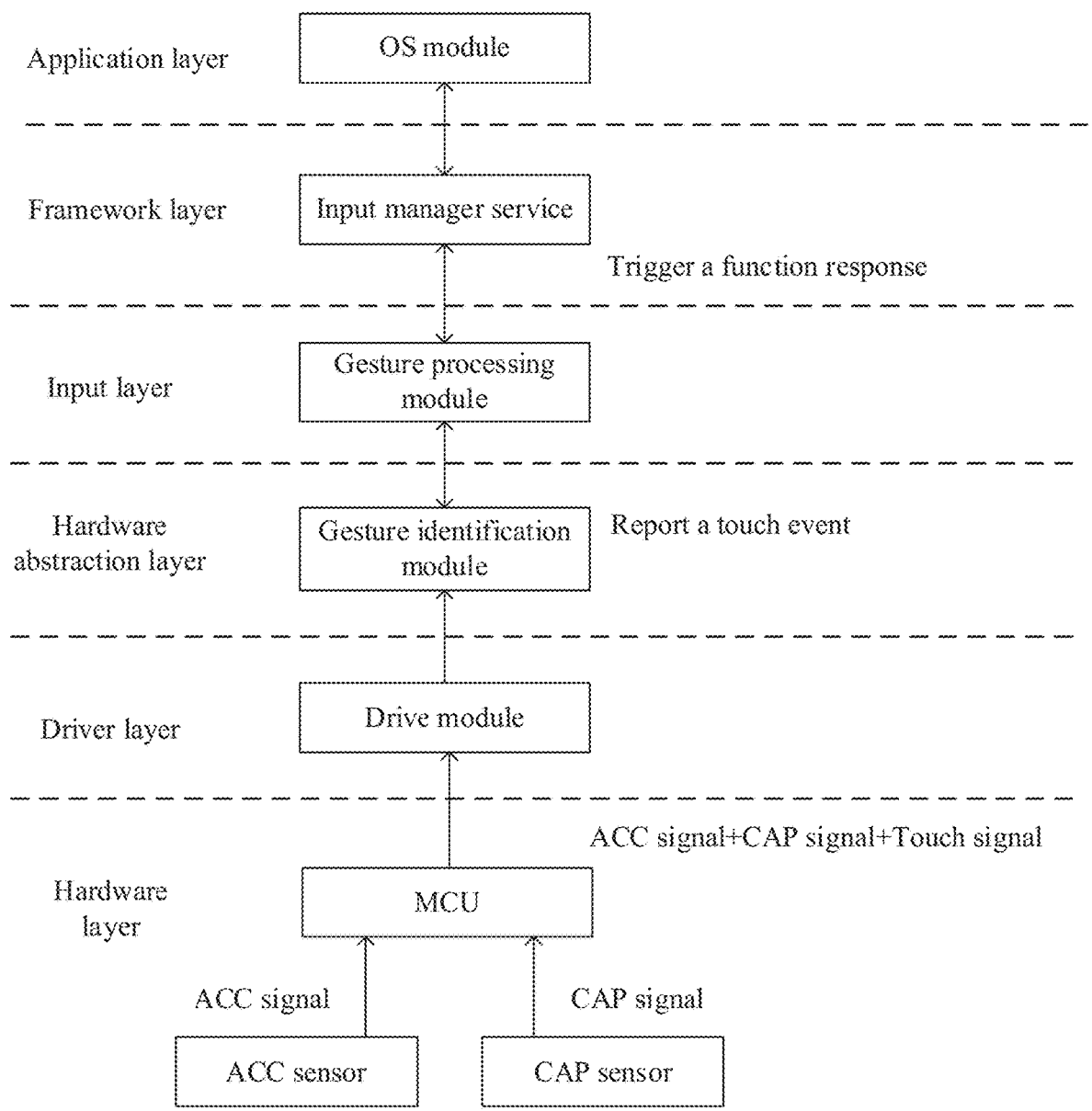
FIG. 28 is a diagram of a software structure of an electronic device according to an embodiment of this application.

FIG. 28 is a diagram of a software structure of an electronic device according to an embodiment of this application. In a layered architecture, software is divided into several layers, and each layer has a clear-cut role and task. The layers communicate with each other through a software interface. In some embodiments, the Android system is divided into the following software layers from top to bottom: an application layer, a framework (FWK) layer, an input (Input) layer, a hardware abstraction layer (HAL), and a driver layer.

In addition, FIG. 28 further shows a hardware layer connected to the software layers. The hardware layer may include a microcontroller unit (microcontroller unit, MCU), an ACC sensor, a CAP sensor, and the like.

The application layer may include a series of application packages, for example, includes an operating system (OS) application. The OS application may trigger a function corresponding to a knuckle touch operation by invoking an application programming interface (API) of the system. The function corresponding to the knuckle touch operation may be customized by using the OS application. In addition, the OS application may provide a user interface for a user, so that the user can customize, in the user interface, the function corresponding to the knuckle touch operation.

The framework layer provides an API and a programming framework for an application at the application layer. The application framework layer includes some predefined functions. For example, the framework layer may include an input manager service for receiving and dispatching an input event, mapping the input event, determining a collected input event, and dispatching the input event to an upper layer. In this embodiment of this application, the input manager service may manage gestures using a finger pulp, a fingertip, a finger nail, a lateral nail, a knuckle, and the like, to perform corresponding shortcut processing action.

The input layer is used to determine a type of an input event. For example, a gesture processing module at the input layer may invoke a gesture identification module at the hardware abstraction layer for determining a touch type of the input event.

The hardware abstraction layer is an interface layer between an operating system kernel and a hardware circuit, and is used for hardware abstraction. The hardware abstraction layer hides hardware interface details of a specific platform, provides a virtual hardware platform for an operating system, and makes the operating system hardware-independent and capable of being transplanted between a plurality of platforms. From the perspective of the hardware abstraction layer, testing of software and hardware may be separately completed based on the hardware abstraction layer, making parallel testing of software and hardware possible.

For example, the ACC sensor acquires an ACC signal, and sends the ACC signal to the MCU. The CAP sensor acquires a CAP signal, and sends the CAP signal to the MCU. The MCU processes the CAP signal to obtain a touch signal, and then the MCU sends the ACC signal, the CAP signal, and the touch signal to the gesture identification module at the hardware abstraction layer. The gesture identification module processes these signals according to the method including S1 to S9 in the foregoing embodiments, to obtain an identification result. If a gesture identification result is a knuckle interaction manner, the gesture identification module reports a knuckle touch event to the OS application by using the gesture processing module and the input manager service sequentially. Then, the OS application may invoke an API interface of an OS to trigger a function corresponding to a knuckle touch operation.

It should be noted that, the touch signal may alternatively be obtained by processing the CAP signal by using a functional module of a software layer. This is not limited in embodiments of this application.

The solutions provided in embodiments of this application are mainly described above from the perspective of the electronic device. It can be understood that, to implement the foregoing functions, the electronic device includes corresponding hardware structures or software modules for performing the functions, or a combination of the two. A person skilled in the art should be easily aware that, in combination with units and algorithm steps in embodiments described in the examples disclosed in this specification, this application can be implemented by hardware or a combination of hardware and computer software. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In embodiments of this application, the electronic device may be divided into functional modules based on the foregoing method examples. For example, each functional module may be obtained through division for each corresponding function, or two or more functions may be integrated into one processing module. The integrated module may be implemented in a form of hardware, or may be implemented in a form of a software functional module. It should be noted that, in embodiments of this application, the division into the modules is an example and is merely logical function division, and may be other division in actual implementation. The following descriptions are based on an example in which functional modules are divided corresponding to functions.

Figure 29:
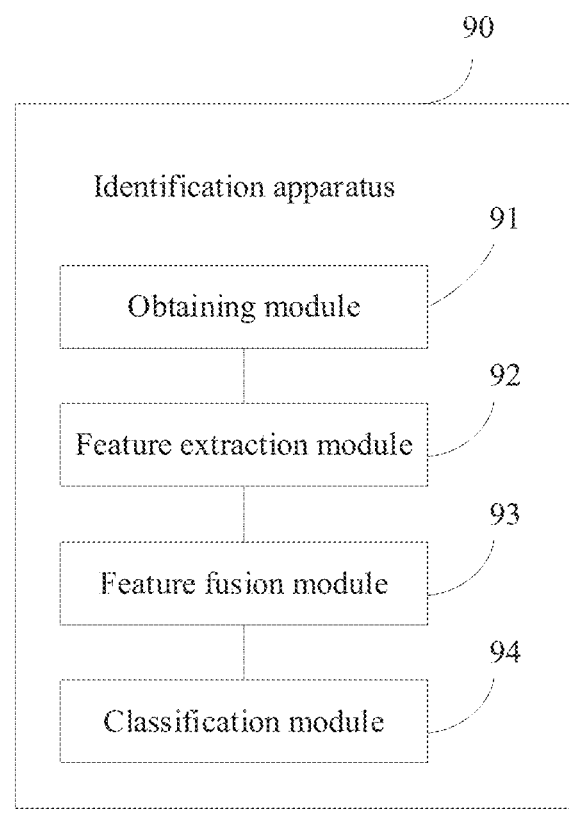
FIG. 29 is a diagram of an identification apparatus according to an embodiment of this application.

FIG. 29 is a diagram of a structure of an identification apparatus according to an embodiment of this application. As shown in FIG. 29, the identification apparatus 90 may include an obtaining module 91, a feature extraction module 92, a feature fusion module 93, and a classification module 94.

The obtaining module 91 is configured to obtain an ACC signal, a CAP signal, and a touch signal in response to a touch operation on a touch panel, where the ACC signal is a raw signal acquired by an ACC sensor, the CAP signal is a raw signal acquired by a CAP sensor, and the touch signal is a signal obtained by processing the CAP signal.

The feature extraction module 92 is configured to extract an ACC feature, a confidence score, a touch feature, where the ACC feature is a feature, in the ACC signal, associated with a knuckle operation, the confidence score is a feature, in the CAP signal, associated with the knuckle operation, and the touch feature is a feature, in the touch signal, associated with the knuckle operation.

The feature fusion module 93 is configured to perform feature fusion on the ACC feature, the confidence score, and the touch feature.

The classification module 94 is configured to input a fused feature into a knuckle classification model to obtain a knuckle classification result. The knuckle classification result indicates whether the touch operation is a knuckle operation or a non-knuckle operation.

In some embodiments, the feature extraction module 92 is specifically configured to extract an ACC feature from the ACC signal. The classification module 94 is further configured to: input the ACC feature into an ACC binary classification model to obtain an ACC classification result; and input the CAP signal into a CAP binary classification model when the ACC classification result indicates that the touch operation is a knuckle operation, to obtain the confidence score. The feature extraction module 92 is specifically configured to extract the touch feature from the touch signal when the ACC classification result indicates that the touch operation is a knuckle operation.

In a possible implementation, the feature extraction module 92 is specifically configured to: extract the ACC feature from the ACC signal, and extract the touch feature from the touch signal. The classification module 94 is further configured to input the ACC feature into the ACC binary classification model to obtain the ACC classification result. The feature extraction module 92 is specifically configured to input the CAP signal into the CAP binary classification model when the ACC classification result indicates that the touch operation is a knuckle operation, to obtain the confidence score.

Figure 30:
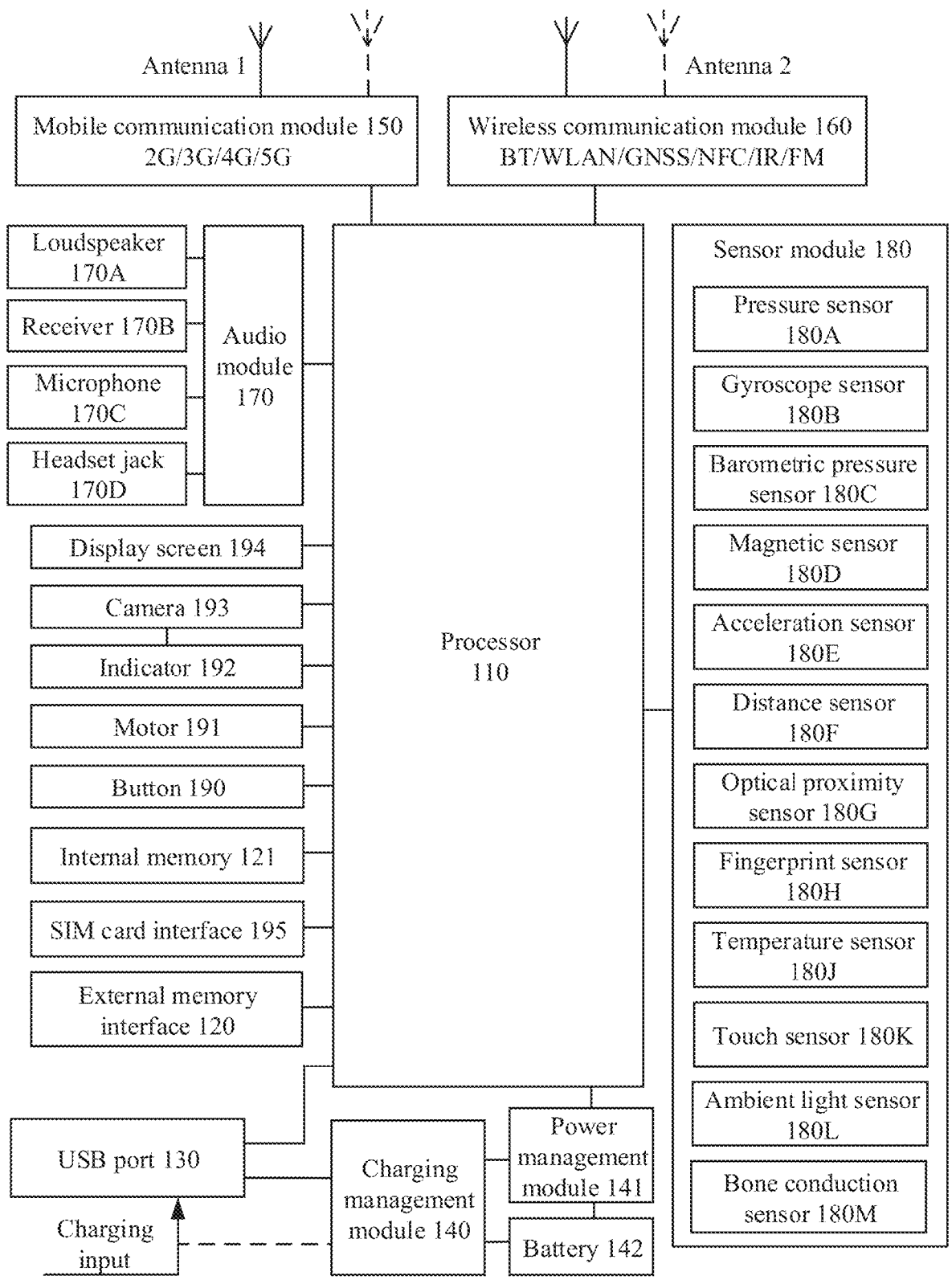
FIG. 30 is a diagram of a hardware structure of an electronic device according to an embodiment of this application.

FIG. 30 is a diagram of a hardware structure of an electronic device according to an embodiment of this application.

As shown in FIG. 30, the electronic device may include a processor 110, an external memory interface 120, an internal memory 121, a USB port 130, a charging management module 140, a power management module 141, a battery 142, an antenna 1, an antenna 2, a mobile communication module 150, a wireless communication module 160, and an audio module 170, a loudspeaker 170A, a receiver 170B, a microphone 170C, a headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include a central processing unit (CPU), an image signal processor (ISP), a digital signal processor (DSP), a video codec, a neural-network processing unit (NPU), a graphics processing unit (GPU), an application processor (AP), and/or a modem processor. In some embodiments, different processing units may be independent devices, or may be integrated into one or more processors.

The CPU is a unit for final execution of information processing and program running, and mainly works for processing instructions, performing operations, controlling time, processing data, and the like. The CPU may include a controller, an arithmetic unit, a cache memory, and a bus for connecting these components. The controller may be a neural center and a command center of the electronic device. The controller may generate an operation control signal based on an instruction operation code and a time-sequence signal, to complete control of fetching an instruction and executing the instruction.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or data again, the instructions or data may be directly invoked from the memory. Repeated access is avoided, and waiting time of the processor 110 is reduced, improving efficiency of the system.

The NPU is a neural-network (NN) computing processor that processes input information quickly by referring to a structure of a biological neural network, for example, by referring to a transmission mode between human brain neurons, and can further perform self-learning continuously. Applications such as intelligent cognition of the electronic device 100, for example, image recognition, face recognition, speech recognition, and text understanding, may be implemented by using the NPU. In embodiments of this application, the NPU may be used to train an ACC binary classification model, a CAP binary classification model, and a knuckle classification model based on an ACC signal and a CAP signal.

The acceleration sensor 180E is configured to detect accelerations of the electronic device 100 in all directions. When the electronic device 100 stays still, a magnitude and a direction of gravity may be detected. The acceleration sensor 180E may be further configured to recognize a posture of the electronic device, and is applied to applications such as landscape/portrait mode switching and a pedometer.

In embodiments of this application, the acceleration sensor 180E may be disposed at an upper left corner of a touch panel. When a knuckle knocks on the touch panel, the acceleration sensor 180E may acquire an ACC signal.

The touch sensor 180K is disposed on the display screen 194, and is configured to detect a touch operation performed on or near the touch sensor. The touch sensor may transfer the detected touch operation to the application processor to determine a type of a touch event. A visual output related to the touch operation may be provided through the display screen 194. In some other embodiments, the touch sensor 180K may be alternatively disposed on a surface of the electronic device 100, and is located at a position different from that of the display screen 194.

In embodiments of this application, the touch sensor 180K may be a CAP sensor. The CAP sensor may be a mutual-capacitive touch sensor or a self-capacitive touch sensor. A characteristic that a sensed capacitance changes when the touch sensor 180K is touched is utilized, and a change of a sensed capacitance at each point is detected based on raw data. When a variation of a sensed capacitance at one or more points is greater than a specific threshold, it is determined that the point has been touched, so that a location of the touched point can be detected.

It should be noted that, when the electronic device is in contact with an object or human body with high conductivity, for example, when the electronic device is held in hand by a user, an earth capacitance of the electronic device is small; or when the electronic device is in contact with an object with low conductivity, for example, when the electronic device is put on an insulator, for example, the table top or is put on the table top with a foldable protective leather case, an earth capacitance of the electronic device is large. In other words, when the electronic device is held in hand by the user, the electronic device is in an earth connection scenario; and when the electronic device is put on the table top, the electronic device is in a floating state.

An embodiment of this application further provides an electronic device, including a processor. The processor is coupled to a memory, and the processor is configured to execute a computer program or instructions stored in the memory, to enable the electronic device to perform the method according to the foregoing embodiments.

An embodiment of this application further provides a computer-readable storage medium. The computer-readable storage medium stores computer instructions, and when the computer instructions are run on an electronic device, the electronic device is enabled to perform the method described above. The computer instructions may be stored in the computer-readable storage medium, or may be transmitted from one computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, by infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium or a semiconductor medium (for example, a solid-state drive (SSD)), or the like.

An embodiment of this application further provides a computer program product. The computer program product includes computer program code. When the computer program code is run on a computer, the computer is enabled to perform the method according to the foregoing embodiments.

An embodiment of this application further provides a chip. The chip is coupled to a memory. The chip is configured to read and execute a computer program or instructions stored in the memory, to perform the method according to the foregoing embodiments. The chip may be a general-purpose processor or a dedicated processor.

It should be noted that the chip may be implemented by using the following circuits or devices: one or more field programmable gate arrays (FPGAs), programmable logic devices (PLDs), controllers, state machines, gate logics, discrete hardware components, any other appropriate circuits, or any combination of circuits that can implement various functions described in this application.

The electronic device, the identification apparatus, the computer-readable storage medium, the computer program product, and the chip provided in embodiments of this application are all configured to perform the method provided above. Therefore, beneficial effects achieved by the electronic device, the identification apparatus, the computer-readable storage medium, the computer program product, and the chip may refer to beneficial effects corresponding to the method provided above. Details are not provided herein again.

It should be understood that the foregoing descriptions are intended to help a person skilled in the art to better understand embodiments of this application, but not to limit the scope of embodiments of this application. A person skilled in the art obviously may perform various equivalent modifications or changes according to the given examples, for example, some steps in the embodiments of the detection method may be unnecessary or some steps may be newly added. Alternatively, any two or more of the foregoing embodiments are combined. A modified, changed, or combined solution may also fall within the scope of embodiments of this application.

It should also be understood that, the foregoing descriptions of embodiments of this application emphasize differences between the embodiments. For the same or similar descriptions that are not mentioned, reference may be made to each other. For brevity, details are not provided herein.

It should also be understood that, serial numbers of the foregoing processes do not indicate an execution sequence, and an execution sequence of the processes shall be determined based on functions and internal logic thereof, and shall constitute no limitation on an implementation process of embodiments of this application.

It should also be understood that, in embodiments of this application, "preset" and "pre-define" may be realized by pre-storing corresponding code and tables on a device (for example, an electronic device) or through other manners for indicating related information. A specific implementation is not limited in this application.

It should also be understood that, division of manners, cases, categories and embodiments in embodiments of this application merely aims to facilitate description rather than constitute specific limitations, and features in various manners, categories, cases, and embodiments may be combined without contradictions.

It should also be understood that, in embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

In the end, it should be noted that, the foregoing descriptions are merely specific implementations of this application, but the protection scope of this application is not limited thereto. Any change or replacement within the technical scope disclosed in this application shall fall within the protection scope of this application. Therefore, the protection scope of this application shall be subject to the protection scope of the claims.

The invention claimed is:

1. A knuckle operation identification method, wherein the method comprises:

obtaining an acceleration signal, a capacitor signal, and a touch signal in response to a touch operation on a touch panel, wherein the acceleration signal is a raw signal acquired by an acceleration sensor, the capacitor signal is a raw signal acquired by a capacitance sensor, and the touch signal is a signal obtained by processing the capacitor signal;

extracting an acceleration feature, a confidence score, and a touch feature, wherein the acceleration feature is a feature, in the acceleration signal, associated with a knuckle operation, the confidence score is a feature, in the capacitor signal, associated with the knuckle operation, and the touch feature is a feature, in the touch signal, associated with the knuckle operation;

performing feature fusion on the acceleration feature, the confidence score, and the touch feature to obtain a fused feature; and inputting the fused feature into a knuckle classification model to obtain a target classification result, wherein the target classification result indicates whether the touch operation is a knuckle operation or a non-knuckle operation.

2. The method according to claim 1, wherein the confidence score is a feature extracted from the touch signal based on the acceleration feature indicating that the touch operation is a knuckle operation.

3. The method according to claim 2, wherein the extracting the acceleration feature, the confidence score, and the touch feature comprises:
   extracting the acceleration feature from the acceleration signal;
   inputting the acceleration feature into an acceleration binary classification model to obtain a preliminary classification result; and
   based on the preliminary classification result indicating that the touch operation is a knuckle operation, inputting the capacitor signal into a capacitance binary classification model to obtain the confidence score, and extracting the touch feature from the touch signal.

4. The method according to claim 3, wherein the capacitance binary classification model is a convolutional neural network model, and the acceleration binary classification model is a fully connected neural network model.

5. The method according to claim 2, wherein the extracting the acceleration feature, the confidence score, and the touch feature comprises:
   extracting the acceleration feature from the acceleration signal, and extracting the touch feature from the touch signal;
   inputting the acceleration feature into an acceleration binary classification model to obtain a preliminary classification result; and
   based on the preliminary classification result indicating that the touch operation is a knuckle operation, inputting the capacitor signal into a capacitance binary classification model to obtain the confidence score.

6. The method according to claim 1,
   wherein the touch feature comprises at least one of a contact location feature or a contact area feature; and
   wherein the contact location feature indicates a location of interaction between a body part and the touch panel, and the contact area feature indicates a contact area of the body part with the touch panel.

7. The method according to claim 6,
   wherein the contact location feature indicates a square coordinate number of a square in which a touch point is located; and
   wherein the square in which the touch point is located is at least one square in a grid obtained by dividing the touch panel based on resolution of the touch panel.

8. The method according to claim 7, wherein the grid comprises p rows and q columns of squares, a length of each square in the grid is equal to a quantity of pixels on a vertical axis of the touch panel divided by p, and a width of each square in the grid is equal to a quantity of pixels on a horizontal axis of the touch panel divided by q, wherein p and q are positive integers.

9. The method according to claim 7,
   wherein the touch feature comprises the contact location feature; and
   wherein extracting the contact location feature comprises:
      determining an x coordinate and a y coordinate of the touch point based on the touch signal; and
      determining, based on the x coordinate and the y coordinate, the contact location feature indicating the square coordinate number of the square in which the touch point is located, wherein an x-axis is a horizontal direction of a plane on which the touch panel is located, and a y-axis is a vertical direction of the plane on which the touch panel is located.

10. The method according to claim 1, wherein the acceleration feature comprises at least one of the following: a maximum gradient feature, a signal amplitude feature, a front-part zero cross counting feature, a maximum high pass feature, a mean-add-absolute-value feature, a front-part normalized value square error feature, a front-part normalized value amplitude feature, a fast Fourier transform mean feature, or a part fast Fourier transform mean feature.

11. The method according to claim 1, wherein the confidence score is a score on a degree of confidence, and the score on the degree of confidence indicates a degree of association between the capacitor signal and a knuckle operation.

12. The method according to claim 1, the knuckle classification model is a fully connected neural network model.

13. The method according to claim 1, wherein the method further comprises:
   determining, based on the target classification result indicating that the touch operation is a knuckle operation, a knuckle gesture to which the touch operation belongs, and performing a responsive function corresponding to the knuckle gesture, wherein different knuckle gestures correspond to different responsive functions.

14. The method according to claim 13, wherein the knuckle gesture comprises at least one of the following: a gesture of knocking twice with a knuckle, a gesture of knocking and drawing an enclosed region with a knuckle, a gesture of knocking with a knuckle and drawing a letter S, a gesture of swiping down on a screen from top to bottom with three knuckles, a gesture of knocking twice with two knuckles, or a gesture of knocking and drawing a straight line in the middle of the screen with a knuckle; wherein a first responsive function corresponding to the gesture of knocking twice with a knuckle is a function of taking a full screenshot; wherein a second responsive function corresponding to the gesture of knocking and drawing an enclosed region with a knuckle is a function of capturing part of the screen; wherein a third responsive function corresponding to the gesture of knocking with a knuckle and drawing a letter S is a function of taking a scroll shot; wherein a fourth responsive function corresponding to the gesture of swiping down on a screen from top to bottom with three knuckles is a function of swiping to take a screenshot; wherein a fifth responsive function corresponding to the gesture of knocking twice with two knuckles is a function of starting or ending screen recording; and wherein a sixth responsive function corresponding to the gesture of knocking and drawing a straight line in the middle of the screen with a knuckle is a function of screen splitting.

15. An electronic device, comprising:
a memory storing a computer program or instructions; and
a processor, wherein the processor is coupled to the memory, and the processor is configured to execute the computer program or instructions stored in the memory, to enable the electronic device to implement a knuckle operation identification method comprising:
obtaining an acceleration signal, a capacitor signal, and a touch signal in response to a touch operation on a touch panel, wherein the acceleration signal is a raw signal acquired by an acceleration sensor, the capacitor signal is a raw signal acquired by a capacitance sensor, and the touch signal is a signal obtained by processing the capacitor signal;
extracting an acceleration feature, a confidence score, and a touch feature, wherein the acceleration feature is a feature, in the acceleration signal, associated with a knuckle operation, the confidence score is a feature, in the capacitor signal, associated with the knuckle operation, and the touch feature is a feature, in the touch signal, associated with the knuckle operation;
performing feature fusion on the acceleration feature, the confidence score, and the touch feature to obtain a fused feature; and
inputting the fused feature into a knuckle classification model to obtain a target classification result, wherein the target classification result indicates whether the touch operation is a knuckle operation or a non-knuckle operation.

16. A non-transitory computer-readable storage medium, wherein the computer-readable storage medium stores a computer program, and when the computer program is run on an electronic device, the electronic device is enabled to perform a knuckle operation identification method comprising:
obtaining an acceleration signal, a capacitor signal, and a touch signal in response to a touch operation on a touch panel, wherein the acceleration signal is a raw signal acquired by an acceleration sensor, the capacitor signal is a raw signal acquired by a capacitance sensor, and the touch signal is a signal obtained by processing the capacitor signal;
extracting an acceleration feature, a confidence score, and a touch feature, wherein the acceleration feature is a feature, in the acceleration signal, associated with a knuckle operation, the confidence score is a feature, in the capacitor signal, associated with the knuckle operation, and the touch feature is a feature, in the touch signal, associated with the knuckle operation;
performing feature fusion on the acceleration feature, the confidence score, and the touch feature to obtain a fused feature; and
inputting the fused feature into a knuckle classification model to obtain a target classification result, wherein the target classification result indicates whether the touch operation is a knuckle operation or a non-knuckle operation.

* * * * *